US009861022B2

(12) United States Patent
Bassett

(10) Patent No.: US 9,861,022 B2
(45) Date of Patent: *Jan. 9, 2018

(54) AGRICULTURAL APPARATUS WITH HYBRID SINGLE-DISK, DOUBLE-DISK COULTER ARRANGEMENT

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

( * ) Notice: Subject to any disclaimer, the term of this patent is extended or adjusted under 35 U.S.C. 154(b) by 97 days.

This patent is subject to a terminal disclaimer.

(21) Appl. No.: 14/944,052

(22) Filed: Nov. 17, 2015

(65) Prior Publication Data
US 2016/0066498 A1     Mar. 10, 2016

Related U.S. Application Data

(63) Continuation of application No. 14/060,049, filed on Oct. 22, 2013, now Pat. No. 9,215,839, which is a
(Continued)

(51) Int. Cl.
*A01B 5/04* (2006.01)
*A01B 15/16* (2006.01)
(Continued)

(52) U.S. Cl.
CPC .............. *A01B 49/027* (2013.01); *A01B 5/04* (2013.01); *A01B 15/16* (2013.01); *A01B 15/18* (2013.01);
(Continued)

(58) Field of Classification Search
CPC .. A01B 5/04; A01B 5/00; A01B 15/16; A01B 15/18; A01B 49/06; A01B 49/04;
(Continued)

(56) References Cited

U.S. PATENT DOCUMENTS 114,002 A     4/1871   Godfrey
321,906 A     7/1885   McCormick
(Continued)

FOREIGN PATENT DOCUMENTS

BE     551372      10/1956
CA     530673      9/1956
(Continued)

OTHER PUBLICATIONS

Case Corporation Brochure, Planters 900 Series Units/Modules Product Information, Aug. 1986 (4 pages).
(Continued)

*Primary Examiner* — Christopher J. Novosad
(74) *Attorney, Agent, or Firm* — Nixon Peabody LLP

(57) ABSTRACT

An agricultural row unit assembly includes an attachment frame, a swing-arm, an opener disk, a deflecting disk, a support, a gauge wheel, and a ground-hardness sensor. The opener disk is mounted to and offset from the distal end of the swing-arm for forming a furrow, and is configured to rotate about a first axis. The deflecting disk is mounted to the distal end of the swing-arm for deflecting debris from entering the furrow, and is configured to rotate about a second axis. The support has a first end pivotably mounted to the swing-arm and a second end movable relative to the opener disk. The gauge wheel is mounted to the second end of the support. The ground-hardness sensor is disposed within the swing-arm and is configured to detect movement of the gauge wheel relative to the opener disk.

20 Claims, 17 Drawing Sheets

Related U.S. Application Data continuation of application No. 14/059,620, filed on Oct. 22, 2013, now Pat. No. 9,215,838, which is a continuation-in-part of application No. 13/757,516, filed on Feb. 1, 2013, now Pat. No. 9,192,091.

(51) Int. Cl.

| | | |
|---|---|---|
| *A01B 15/18* | (2006.01) | |
| *A01B 49/06* | (2006.01) | |
| *A01B 49/02* | (2006.01) | |
| *A01B 61/04* | (2006.01) | |
| *A01B 63/24* | (2006.01) | |
| *A01B 63/00* | (2006.01) | |
| *A01C 5/06* | (2006.01) | |
| *A01C 7/20* | (2006.01) | |
| *A01C 21/00* | (2006.01) | |

(52) U.S. Cl.
CPC ............ *A01B 49/06* (2013.01); *A01B 61/046* (2013.01); *A01B 63/008* (2013.01); *A01B 63/24* (2013.01); *A01C 5/064* (2013.01); *A01C 5/068* (2013.01); *A01C 7/205* (2013.01); *A01C 21/002* (2013.01)

(58) Field of Classification Search
CPC ..... A01B 49/00; A01B 61/046; A01B 61/044; A01B 61/04; A01B 61/00; A01B 63/008; A01B 63/002; A01B 63/00; A01B 63/24; A01B 63/14; A01B 49/027; A01B 49/02; A01C 5/064; A01C 5/062; A01C 5/06; A01C 5/00; A01C 5/068; A01C 5/066; A01C 7/205; A01C 7/201; A01C 7/20; A01C 7/00; A01C 21/002; A01C 21/00
See application file for complete search history.

(56) References Cited

U.S. PATENT DOCUMENTS

| | | |
|---|---|---|
| 353,491 A | 2/1886 | Wells |
| 523,508 A | 7/1894 | Bauer |
| 736,369 A | 8/1903 | Dynes |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |

(56) References Cited

U.S. PATENT DOCUMENTS

| | | |
|---|---|---|
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,630,773 A | 12/1986 | Ortlip |
| 4,643,043 A | 2/1987 | Furuta |
| 4,646,620 A | 3/1987 | Buchl |
| 4,646,850 A | 3/1987 | Brown |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,998,488 A | 3/1991 | Hansson |
| 5,015,997 A | 5/1991 | Strubbe |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobbs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,091,997 A | 7/2000 | Flamme |
| 6,164,385 A | 12/2000 | Buchl |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,644,224 B1 | 11/2003 | Bassett |
| 6,681,868 B2 | 1/2004 | Kovach |
| 6,701,856 B1 | 3/2004 | Zoske |
| 6,701,857 B1 | 3/2004 | Jensen |
| 6,715,433 B1 | 4/2004 | Friestad |
| 6,786,130 B2 | 9/2004 | Steinlage |

(56) References Cited

U.S. PATENT DOCUMENTS

| | | |
|---|---|---|
| 6,834,598 B2 | 12/2004 | Jüptner |
| 6,840,853 B2 | 1/2005 | Foth |
| 6,886,650 B2 | 5/2005 | Bremner |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,222,575 B2 | 5/2007 | Bassett |
| 7,290,491 B2 | 11/2007 | Summach |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,523,709 B1 | 4/2009 | Kiest |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 8,146,519 B2 | 4/2012 | Bassett |
| 8,151,717 B2 | 4/2012 | Bassett |
| 8,171,707 B2 | 5/2012 | Kitchel |
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 6,644,224 C1 | 6/2013 | Bassett |
| 6,912,963 C1 | 6/2013 | Bassett |
| 7,222,575 C1 | 7/2013 | Bassett |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,732 B2 | 12/2014 | Bassett |
| 8,985,232 B2 | 3/2015 | Bassett |
| 9,003,983 B2 | 4/2015 | Roth |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,167,740 B2 | 10/2015 | Bassett |
| 9,192,089 B2 | 11/2015 | Bassett |
| 9,192,091 B2 * | 11/2015 | Bassett ................. A01B 49/04 |
| 9,215,838 B2 * | 12/2015 | Bassett ................. A01B 49/06 |
| 9,215,839 B2 * | 12/2015 | Bassett ................. A01B 49/06 |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 2002/0162492 A1 | 11/2002 | Juptner |
| 2004/0005929 A1 | 1/2004 | Piasecki |
| 2006/0102058 A1 | 5/2006 | Swanson |
| 2006/0191695 A1 | 8/2006 | Walker et al. |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2010/0019471 A1 | 1/2010 | Ruckle |
| 2010/0103336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0060864 A1 | 3/2014 | Martin |
| 2014/0190712 A1 | 7/2014 | Bassett |
| 2014/0197249 A1 | 7/2014 | Roth |
| 2014/0224513 A1 | 8/2014 | Van Buskirk |
| 2015/0216108 A1 | 8/2015 | Roth |
| 2015/0237791 A1 | 8/2015 | Bassett |
| 2015/0373901 A1 | 12/2015 | Bassett |
| 2016/0100520 A1 | 4/2016 | Bassett |
| 2016/0128263 A1 | 5/2016 | Bassett |
| 2016/0128265 A1 | 5/2016 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |

OTHER PUBLICATIONS

Buffalo Farm Equipment All Flex Cultivator Operator Manual, Apr. 1990 (7 pages).

Shivvers, Moisture Trac 3000 Brochure, Aug. 21, 1990 (5 pages).

The New Farm, "*New Efficiencies in Nitrogen Application,*" Feb. 1991, p. 6 (1 page).

Hiniker Company, Flow & Acreage Continuous Tracking System Monitor Demonstration Manuel, date estimated as early as Feb. 1991 (7 pages).

Russnogle, John, "*Sky Spy: Gulf War Technology Pinpoints Field and Yields,*" Top Producer, A Farm Journal Publication, Nov. 1991, pp. 12-14 (4 pages).

(56) References Cited

OTHER PUBLICATIONS

Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels*!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).
Martin Industries, LLC Paired 13 Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).

* cited by examiner

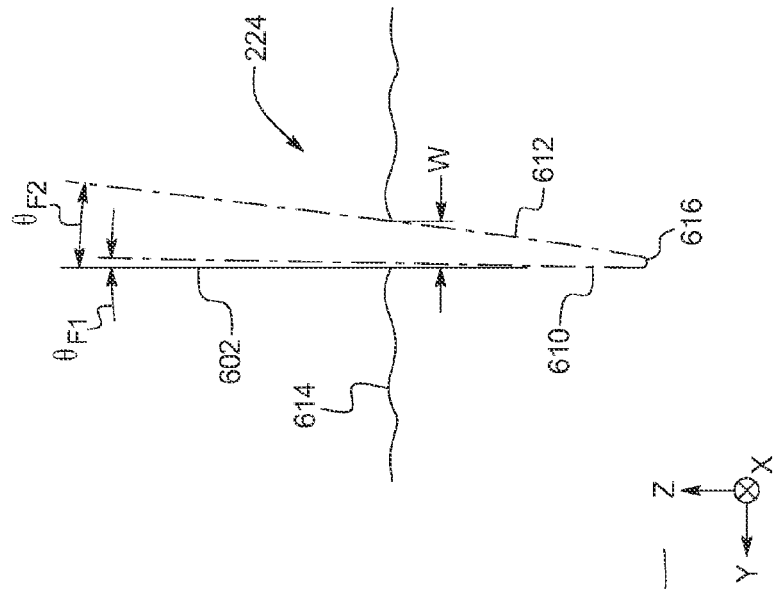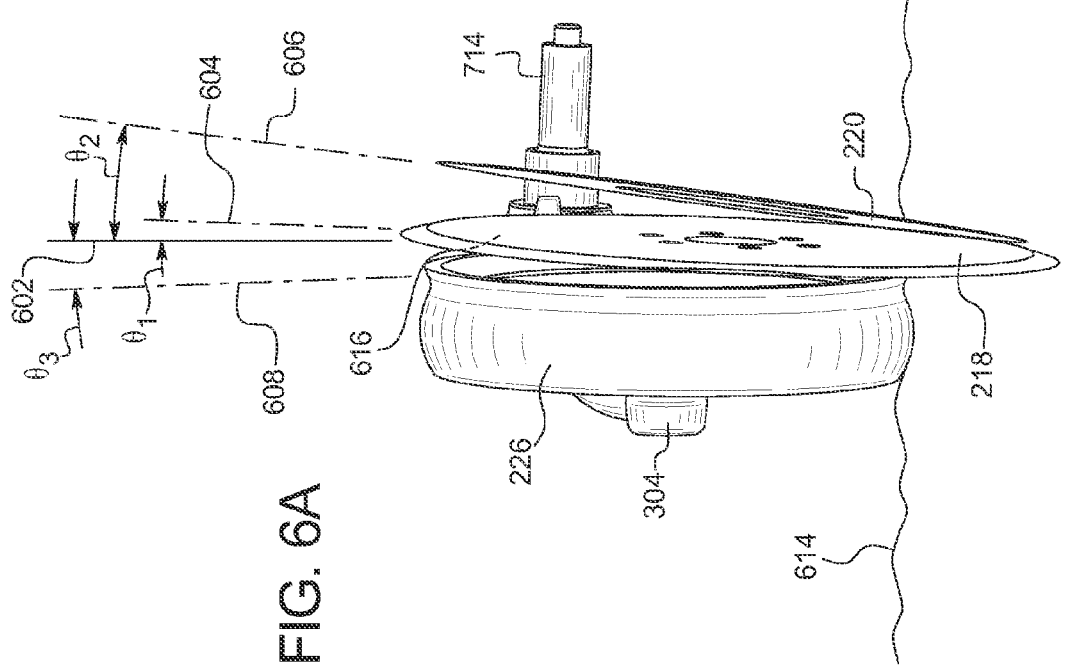

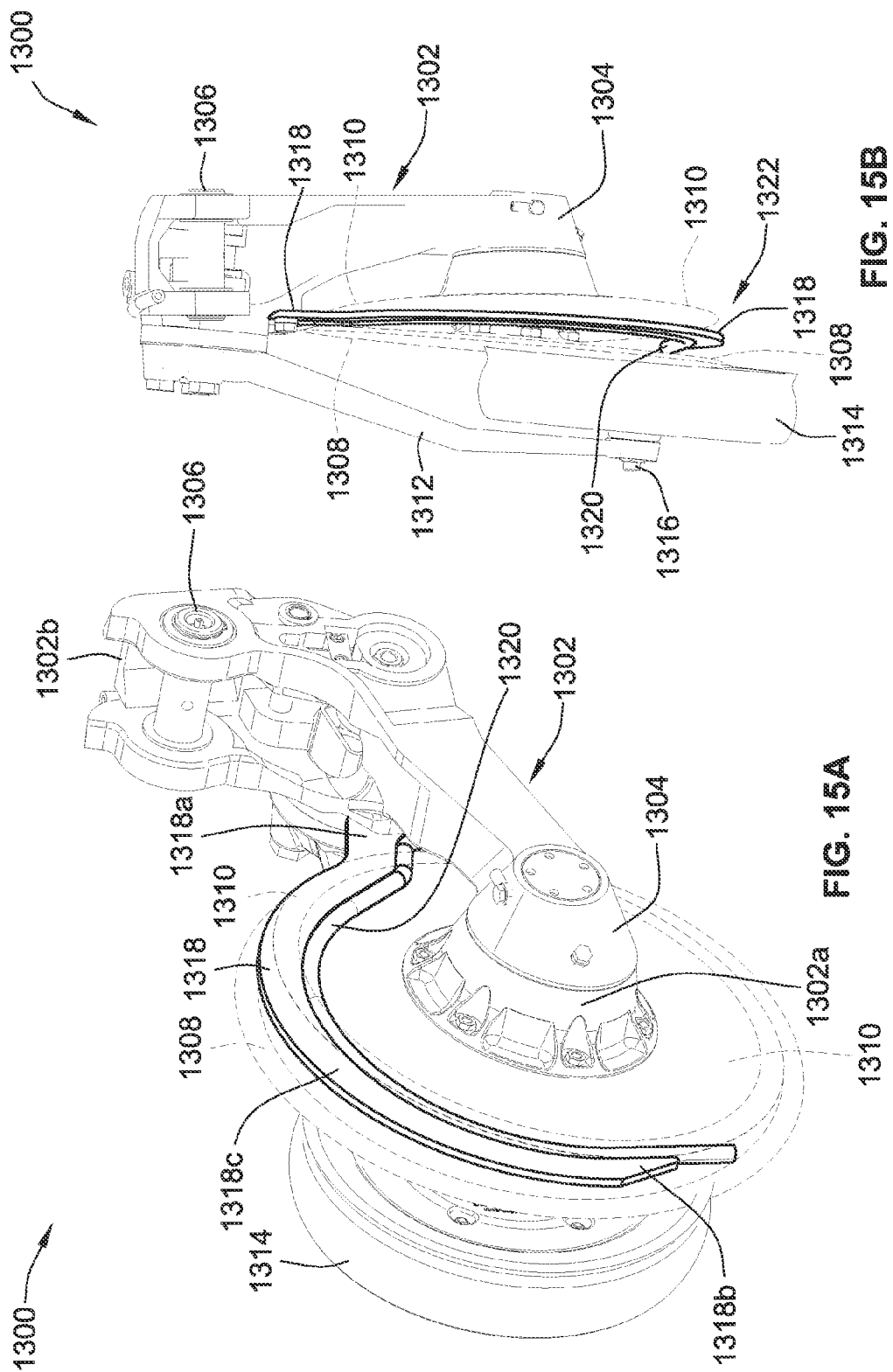

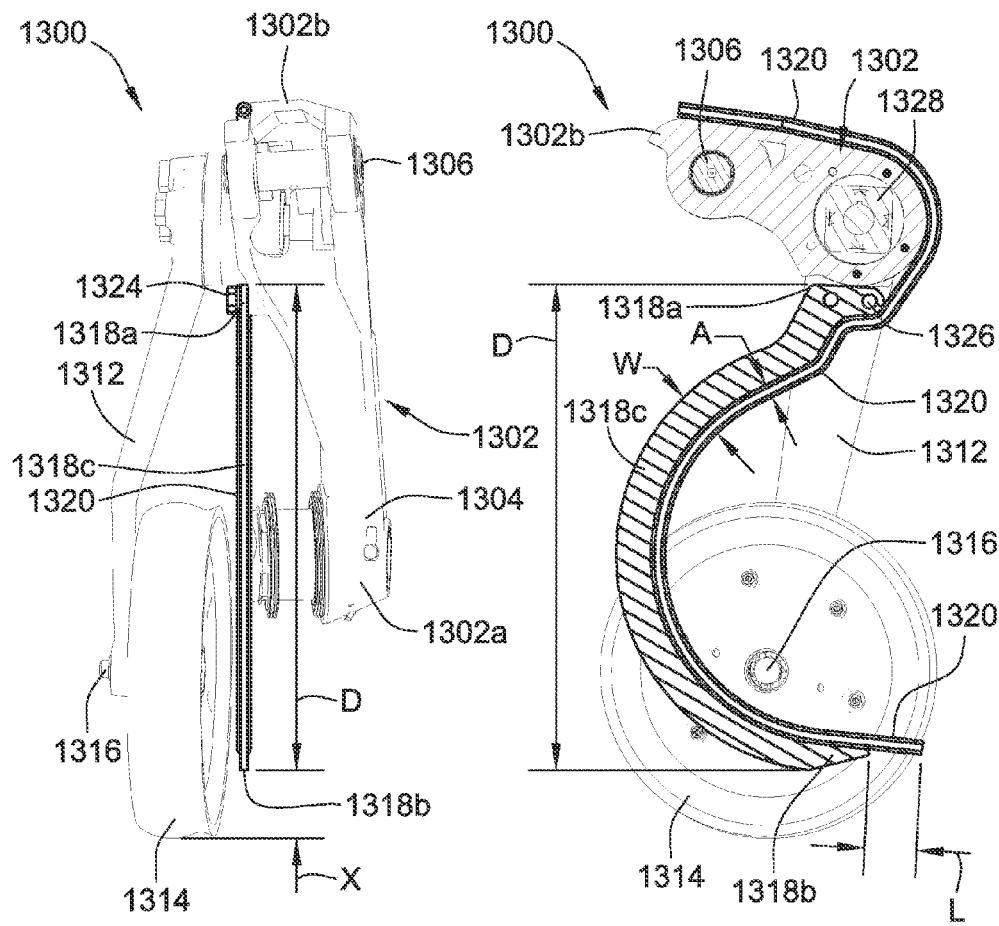
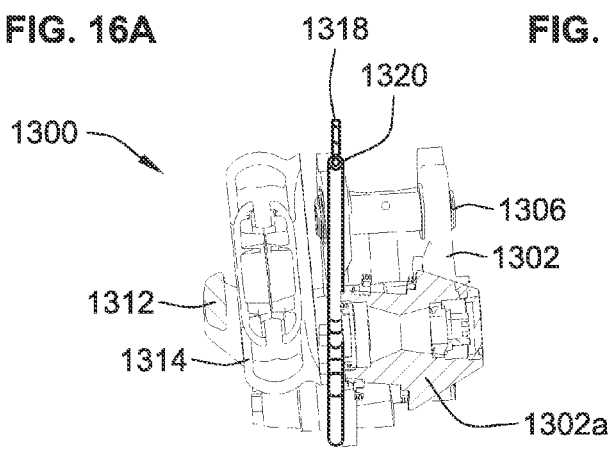
FIG. 16A
FIG. 16B
FIG. 16C

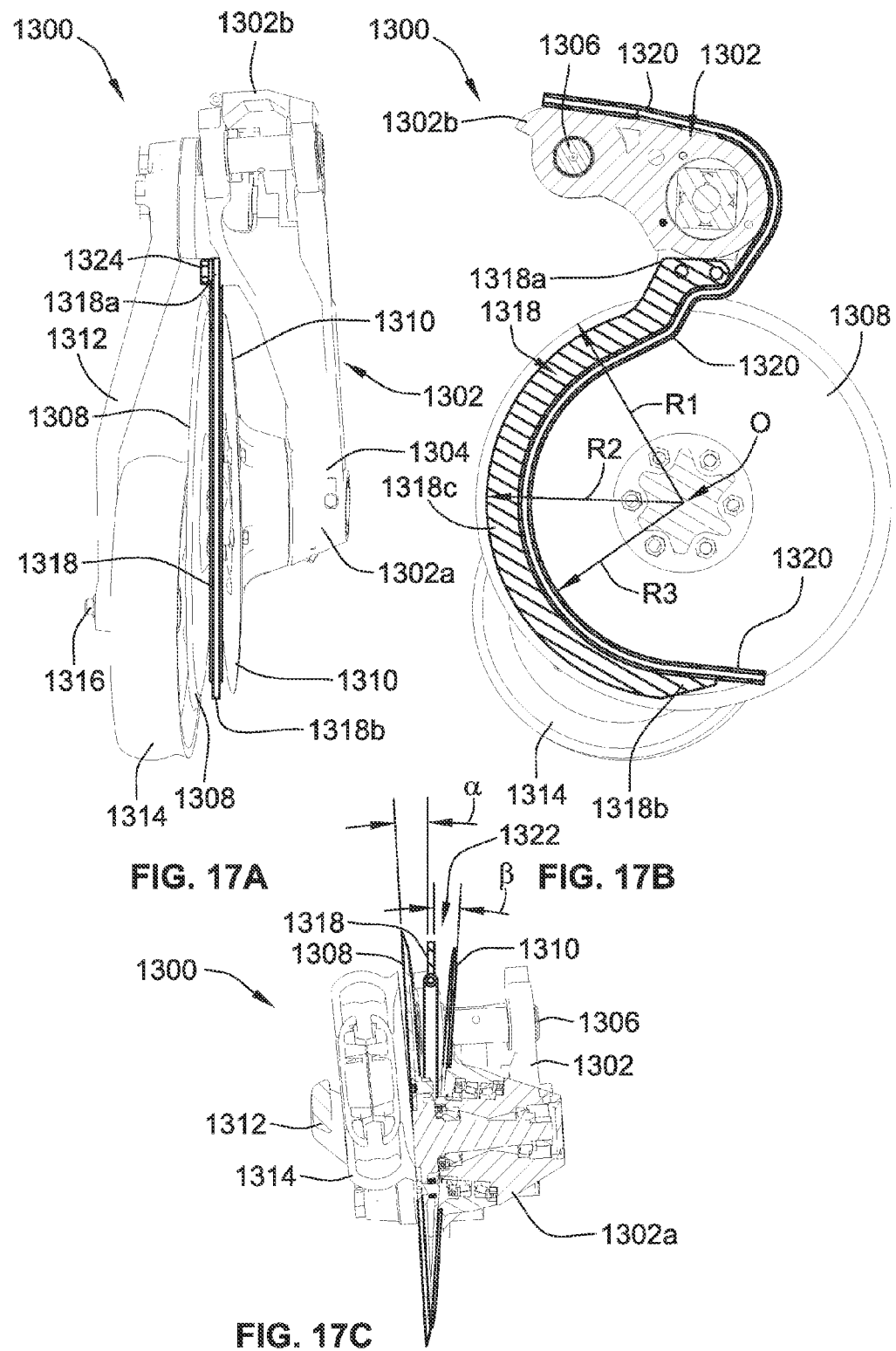

AGRICULTURAL APPARATUS WITH HYBRID SINGLE-DISK, DOUBLE-DISK COULTER ARRANGEMENT

CROSS-REFERENCE TO RELATED APPLICATION

This application is a continuation of U.S. patent application Ser. No. 14/060,049, filed on Oct. 22, 2013, for an "Agricultural Apparatus With Hybrid Single-disk, Double-Disk Coulter Arrangement," which is a continuation of U.S. patent application Ser. No. 14/059,620, filed on Oct. 22, 2013, for an "Agricultural Apparatus With Hybrid Single-disk, Double-Disk Coulter Arrangement," which is a continuation-in-part of U.S. patent application Ser. No. 13/757,516, filed on Feb. 1, 2013, for an "Agricultural Apparatus With Hybrid Single-Disk, Double-Disk Coulter Arrangement," each of which is incorporated by reference herein in their entirety.

FIELD OF THE INVENTION

The present invention relates generally to agricultural equipment and, more particularly, to an agricultural assembly having a disk opener.

BACKGROUND OF THE INVENTION

In agricultural applications, farmers have typically used a single-disk or double-disk opener for opening a furrow, roughly of a parabolic cross-section, in which material is deposited (such as seed or fertilizer).

Single-disk openers use one disk to cut and shape the furrow. A material shoe is generally disposed behind a leading edge of the disk and is used to deposit material in the furrow. The use of a single disk to open the furrow requires minimal down-pressure to be applied in order to open the furrow. However, disadvantages arise when debris falls into the furrow before the material shoe has passed.

Alternatively, double-disk openers use two disks to cut and shape the furrow. Typically, the two disks form a V-shape with the material shoe in-between. The V-shaped arrangement helps protect the material shoe from debris entering the furrow, but requires much higher down-pressure to be applied in order to cut the furrow. This increase of down-pressure leads to increased wear and tear on the disk opener and increased fuel consumption.

Traditionally, constant down-pressure is applied by the single-disk or double-disk opener using a resilient member such as a spring. This constant down-pressure results in a furrow of different depth as soil conditions such as soil hardness change. Thus, the material placement is not consistent across varying soil conditions. Inconsistent material placement can lead to lower yielding crops and other problems.

Thus, it would be desirable to develop a system that overcomes the problems and limitations associated with traditional single-disk and double-disk openers.

SUMMARY OF THE INVENTION

In accordance with one embodiment, an agricultural row unit assembly includes an attachment frame configured for attachment to a tow bar movable in a direction of travel, and a swing-arm having a proximal end and a distal end, the proximal end being coupled to the attachment frame. The assembly further includes an opener disk mounted to and offset from the distal end of the swing-arm for forming a furrow, the opener disk being configured to rotate about a first axis relative to the direction of travel. The assembly also includes a deflecting disk mounted to the distal end of the swing-arm for deflecting debris from entering the furrow, the deflecting disk being configured to rotate about a second axis relative to the direction of travel, the second axis being different than the first axis. The assembly also includes a support having a first end pivotably mounted to the swing-arm and a second end movable relative to the opener disk, and a gauge wheel mounted to the second end of the support. The assembly also includes a ground-hardness sensor disposed within the swing-arm and configured to detect movement of the gauge wheel relative to the opener disk.

In accordance with another embodiment, an agricultural row unit assembly includes an attachment frame configured for attachment to a tow bar movable in a direction of travel, and a swing-arm having a proximal end and a distal end, the proximal end being coupled to the attachment frame. The assembly further includes an opener disk mounted to and offset from the distal end of the swing-arm for forming a furrow. The assembly also includes a deflecting disk mounted to the distal end of the swing-arm for deflecting debris from entering the furrow, the deflecting disk being mounted between the distal end of the swing-arm and the opener disk. The assembly also includes a gauge wheel mounted to the swing-arm and being movable relative to the opener disk and the deflecting disk. The assembly also includes a ground-hardness sensor coupled to the opener disk and the gauge wheel, the ground-hardness sensor outputting a signal indicative of the position of the gauge wheel relative to the opener disk.

BRIEF DESCRIPTION OF THE DRAWINGS

The invention may best be understood by reference to the following description taken in conjunction with the accompanying drawings.

FIG. 6A illustrates a rear view of a portion of the disk opener of FIG. 2.

FIG. 6B illustrates a cross-sectional view of a furrow created by the disk opener of FIG. 2.

FIG. 15A is a perspective view of a swing-arm assembly with a disk opener and a support bracket.

FIG. 15B is a top view of the swing-arm assembly of FIG. 15A.

FIG. 16A is a top view of the swing-arm assembly of FIG. 15A illustrated without the disk opener.

FIG. 16B is a partial cross-sectional side view of FIG. 16A.

FIG. 16C is a partial cross-sectional front view of FIG. 16A.

FIG. 17A is a top view of the swing-arm assembly of FIG. 15A illustrated with the disk opener.

FIG. 17B is a partial cross-sectional side view of FIG. 17A.

FIG. 17C is a partial cross-sectional front view of FIG. 17A.

DETAILED DESCRIPTION OF ILLUSTRATED EMBODIMENTS

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Tractors are generally used to tow agricultural implements, particularly when the implement is being used to till a field. As the tractor travels along the surface of a field, the implement generally follows substantially the same path as the tractor, defining a direction of travel. The implement typically comprises a plurality of row units, each row unit generally following the direction of travel of the implement.

Figure 1:
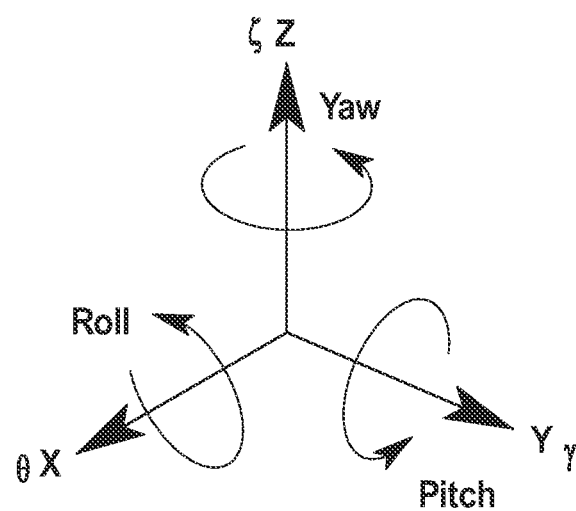
FIG. 1 illustrates a coordinate axis depicting pitch, yaw, and roll as used herein.

Turning now to the drawings and referring first to FIG. 1, a coordinate axis depicting pitch, yaw, and roll is shown. As used herein, the x-axis is generally aligned with the direction of travel. Rotation about the x-axis is typically referred to as "roll." Also as used herein, the y-axis is generally perpendicular to the x-axis and generally extends horizontally along the surface of the field. Rotation about the y-axis is generally referred to as "pitch." Further as used herein, the z-axis is generally perpendicular to both the x-axis and the y-axis and generally extends vertically from the surface of the field. Rotation about the z-axis is generally referred to as "yaw."

Figure 2:
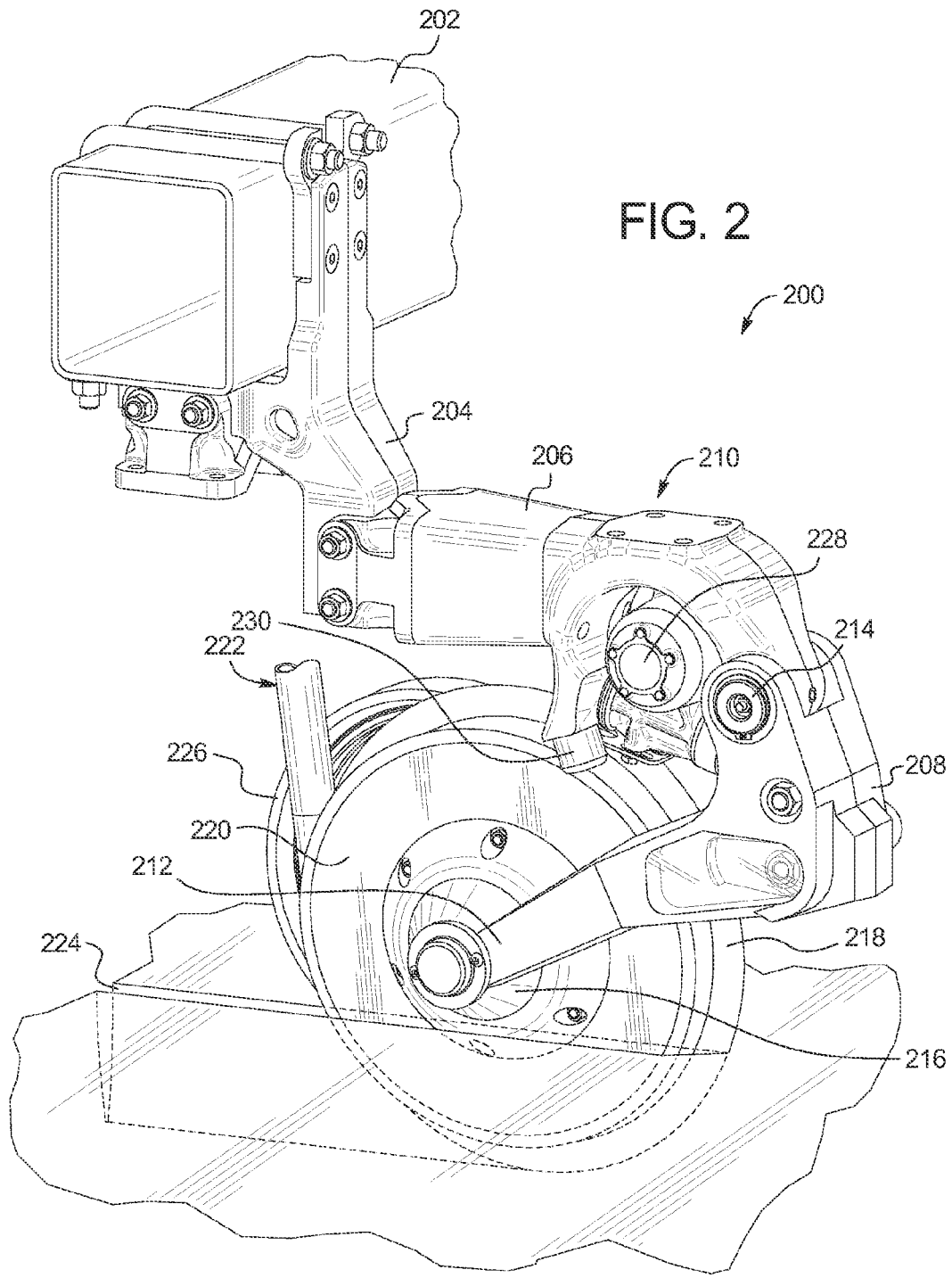
FIG. 2 illustrates a perspective view of a disk opener having a hybrid single-disk, double-disk opener arrangement, according to an aspect of the present disclosure.
Figure 3:
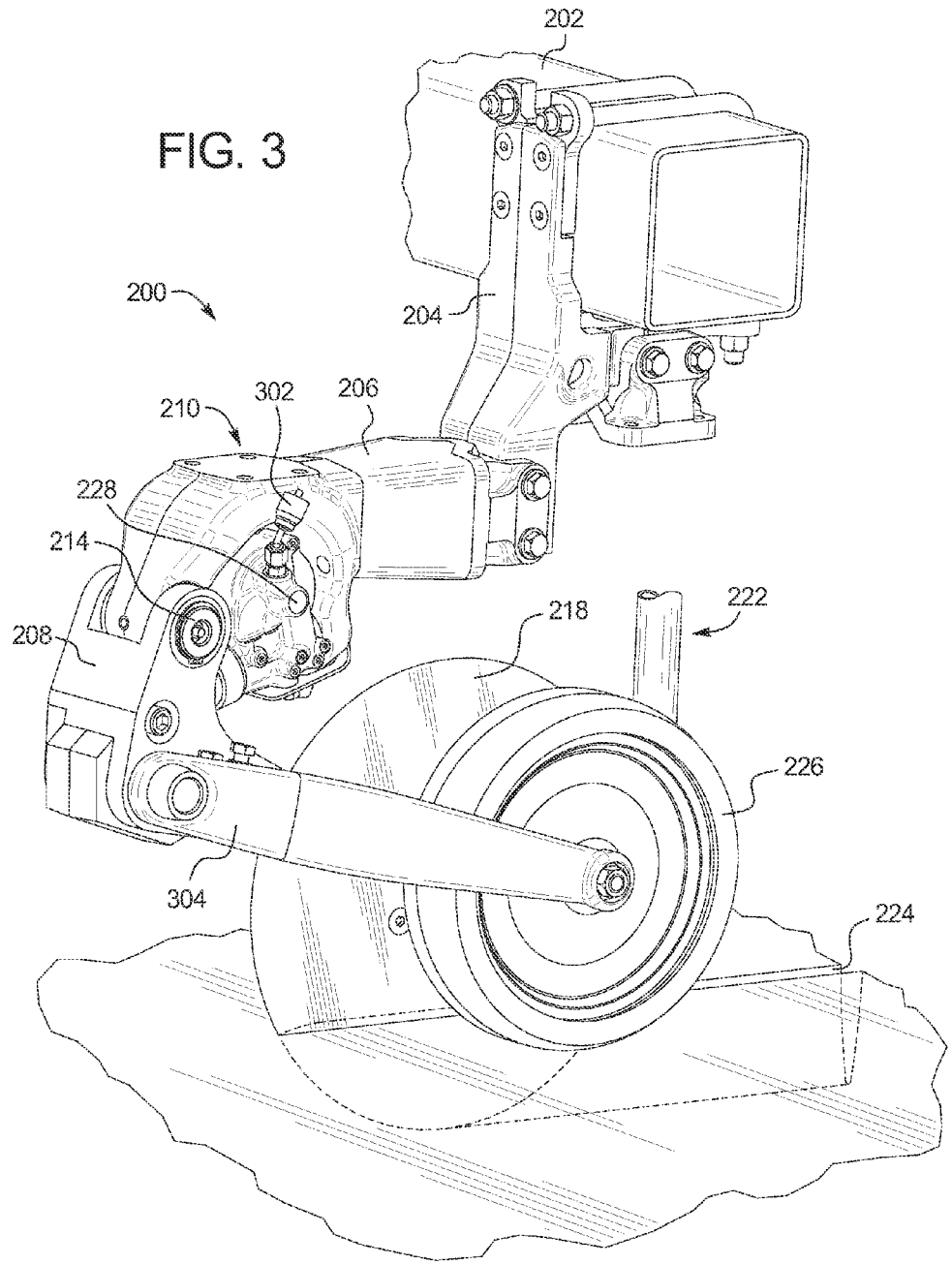
FIG. 3 illustrates a second perspective view of the disk opener of FIG. 2.

Referring to FIGS. 2 and 3, a disk opener 200 is shown. FIG. 2 illustrates a first perspective view of the disk opener 200. FIG. 3 illustrates a second perspective view of the disk opener 200. The disk opener 200 is coupled to a towing frame 202 that is coupled to a tractor. An attachment frame 204 rigidly connects row unit 200 to the towing frame 202. A linkage 206 couples the attachment frame 204 and a proximal end 210 of a swing-arm 208. The linkage 206 may rigidly connect the attachment frame 204 and the proximal end 210 or may allow vertical pivoting movement of the proximal end of the swing-arm 208 relative to the attachment frame 204.

The swing-arm 208 includes a distal end 212 that is movable relative to the proximal end 210. In some aspects, the proximal end 210 and the distal end 212 pivot about an axis defined by a pin 214. The distal end 212 includes a housing 216 supporting a primary disk 218, a deflecting disk 220, and a material shoe assembly 222. In some aspects, as will be described in more detail with reference to FIGS. 6A and 6B below, the primary disk 218 is configured to open at least a portion of a furrow 224 and the deflecting disk 220 is configured to deflect debris from entering the furrow 224 and/or contacting the material shoe assembly 222. As will be described in further detail with reference to FIG. 8 below, the material shoe assembly 222 is configured to deliver material such as seed or fertilizer into the furrow 224.

In one nonlimiting example, a hybrid double-disk, single-disk opener (alternatively, "hybrid disk opener") includes two disks having different diameters. In some aspects, the primary disk 218 has a first diameter and the deflecting disk 220 has a second diameter that is smaller than the first diameter. The primary disk 218 engages an amount of soil to cut the furrow and the deflecting disk 220 engages less soil than the primary disk 218 due to the smaller diameter. Advantageously, the hybrid disk opener requires less down-pressure to properly place material in the furrow 224 than a traditional double-disk opener because of the lessened soil engagement. Additionally, the deflecting disk 220 provides advantages over a traditional single-disk opener for material placement at a desired depth and/or lateral spacing by substantially preventing debris from entering the furrow before the material has been placed in the furrow 224. It has also been determined that many problems associated with traditional single-disk openers, with a stationary material shoe design, including high friction, high wear, pinching by residue, and inconsistent material placement are due to debris falling into the furrow prior to passage of the material shoe. The deflecting disk 220 also provides benefits over a traditional single-disk opener by lessening wear and tear on the material shoe apparatus 222.

The disk opener 200 also comprises a wiper wheel 226 and a down-pressure mechanism 228. The wiper wheel 226 is coupled to the swing-arm 208 by a support 304 that allows movement of the wiper wheel 226 relative to the primary disk 218. The wiper wheel 226 is configured to clean soil and/or other debris from the primary disk 218 and also to gauge the soil penetration of the primary disk 218. Different soil conditions can cause many different levels of "stickiness" that result in different tendencies of soil adherence to the primary disk 218.

The down-pressure mechanism 228 is configured to apply pressure to the swing-arm 208 to assist the primary disk 218 in penetrating the soil. The down-pressure applied can be dependent on the position of at least a portion of the down-pressure mechanism 228 or can be dependent on the position of two or more components of the implement relative to each other. In some aspects, the down-pressure mechanism 228 includes a spring that applies increasing amounts of force as the spring is compressed and/or extended. In some aspects, the down-pressure mechanism 228 includes a hydraulic device that applies varying amounts of pressure as it is extended and retracted. In some aspects, as will be described in more detail with reference to FIG. 7, the down-pressure mechanism 228 includes a hydraulic device that varies an applied down-pressure dependent upon the vertical displacement of the wiper wheel 226 with respect to the primary disk 218.

Figure 4:
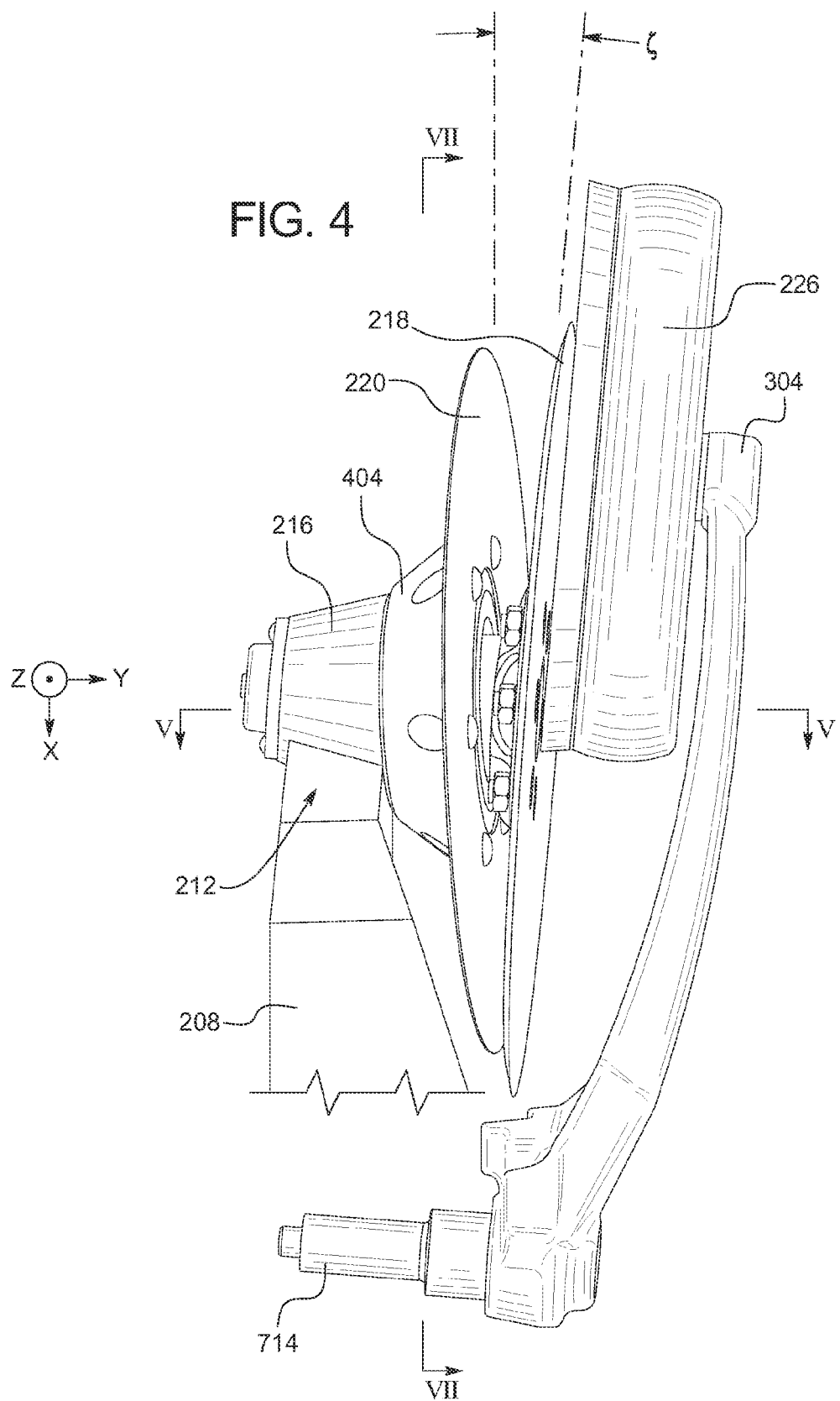
FIG. 4 illustrates a top-down view of a portion of the disk opener of FIG. 2.

Referring to FIG. 4, a top-down view of a portion of the disk opener 200 is shown with the material shoe apparatus 222 omitted. A housing 216 is disposed at the distal end 212 of the swing-arm 208. The housing 216 couples the primary disk 218 and the deflecting disk 220 to the swing-arm. A spindle (FIG. 5) is disposed within the housing and coupled to the primary disk 218. The spindle maintains the orientation of the primary disk 218 relative to the housing 216. A hub 404 is disposed about the housing 216 and is coupled to the deflecting disk 220. The hub 404 maintains the orientation of the deflecting disk 220 relative to the housing 216.

In one non-limiting example, the deflecting disk 220 is disposed behind the primary disk 218 in the direction of travel. In some aspects, a leading edge of the deflecting disk 220 is disposed behind a portion of the primary disk 218 with respect to the direction of travel. In some aspects, a leading edge of the deflecting disk 220 is aligned with a leading edge of the primary disk 218. In some aspects, the primary disk 218 has a first yaw angle $\zeta_P$ that is yawed about the z-axis and the deflecting disk 220 has a second yaw angle $\zeta_D$ that is yawed about the z-axis. The first yaw angle $\zeta_P$ has a substantially greater magnitude than the second yaw angle $\zeta_D$. In the illustrated embodiment, the first yaw angle $\zeta_P$ is yawed about the vertical axis in a first direction and the second yaw angle $\zeta_D$ is yawed about the vertical axis in a second direction opposite the first direction. In one nonlimiting example, the first yaw angle $\zeta_P$ measures between about 3° and about 7°. More preferably, the first yaw angle $\zeta_P$ measures about 5°. In one nonlimiting example, the second yaw angle $\zeta_D$ measures between about 0° and about 2°. More preferably, the second yaw angle $\zeta_D$ measures about 1°. The width W of the furrow at the surface is substantially determined by the first yaw angle $\zeta_P$ of the primary disk.

Figure 5:
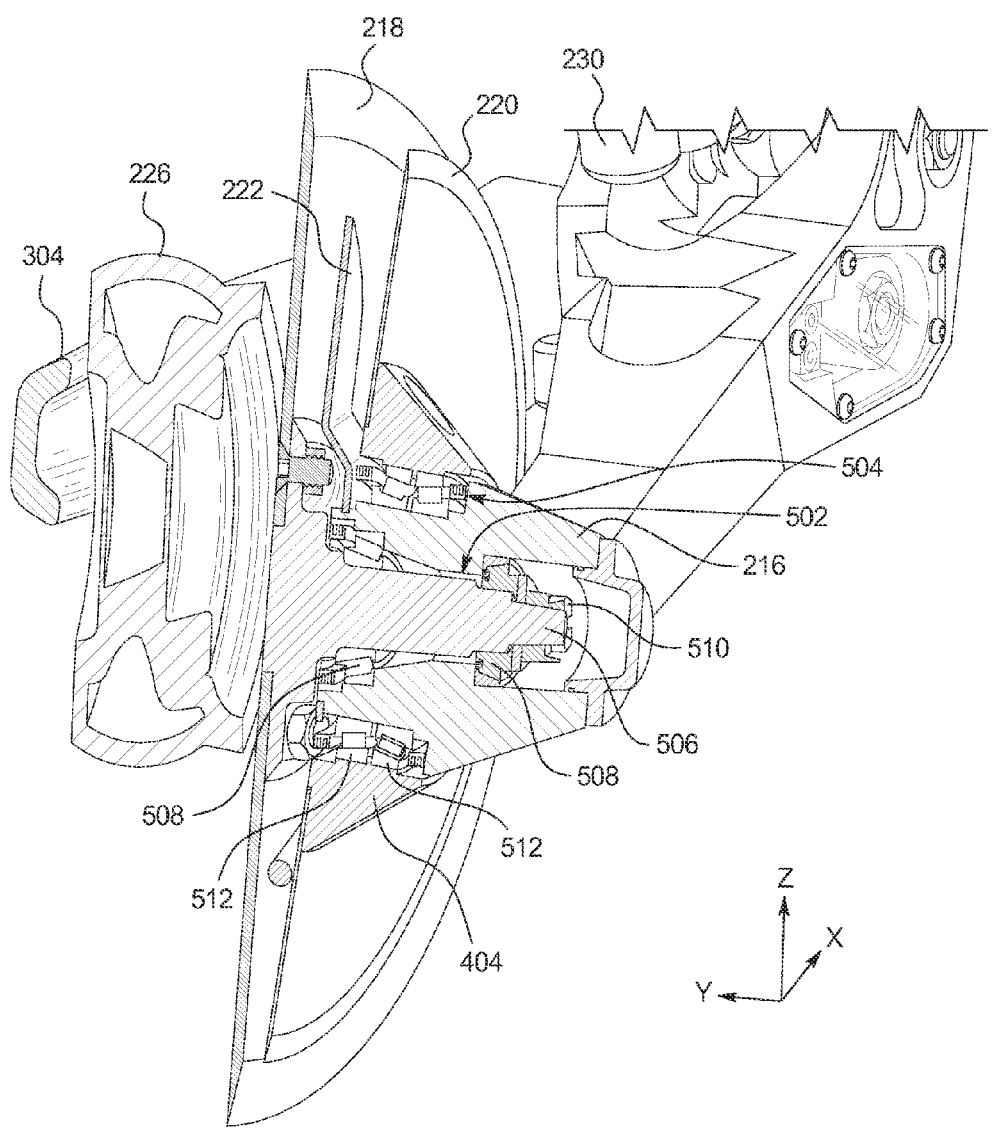
FIG. 5 is a cross-sectional view of a portion of the disk opener of FIG. 4 along line V-V.

Referring to FIG. 5, a cross-sectional view of the disk of the disk opener 200 including the housing 216 is shown. The housing 216 defines a bore 502 therein and also defines a bearing seat 504 about the periphery of the housing 216. A spindle 506 is coupled to the primary disk 218 and defines a first axis of rotation of the primary disk 218. The spindle 506 is disposed within the bore 502. A plurality of bearings 508 engages the bore 502 and the spindle 506. The plurality of bearings 508 prevents radial movement of the spindle 506. In some aspects, a crown-nut 510 engages the spindle 506 and the plurality of bearings 508 to prevent longitudinal movement of the spindle 506 in a first direction. In some aspects, the spindle 506 engages the plurality of bearings 508 to prevent movement of the spindle 506 in a second direction.

The bearing seat 504 receives a plurality of bearings 512 coupled to the deflecting disk 220 via the hub 404. The plurality of bearings 512 prevents radial movement of the hub 404. In some aspects, the bearing seat 504 prevents axial movement of the deflecting disk 220 in a first direction. In some aspects, the material shoe apparatus 222 prevents axial movement of the deflecting disk 220 in a second direction.

Advantageously, the housing 216 defines the first axis of rotation and the second axis of rotation. As shown in FIG. 5, the spindle 506 passes through, but does not engage, the hub 404 and deflecting disk 220. Further, altering one axis of rotation will not affect the other axis of rotation. In one non-limiting example, the second axis of rotation is substantially aligned with the y-axis. In this non-limiting example, the first axis of rotation can be yawed at 5°, 10°, 20°, 30°, etc. from the y-axis. Additionally, in this non-limiting example, the second axis may be pitched at 5°, 10°, 20°, 30°, etc. from the y-axis.

Advantageously, the housing 216 may be disposed outside of the primary disk 218 and the secondary disk 220. This allows the disks to be spaced closely together because fewer components need to be disposed between the two disks. Further, the swing-arm being disposed on a single side of both disks allows easier access to the disks and components for maintenance and repairs than two swing-arms where each is disposed on the outside of each disk.

Referring to FIG. 6A, which illustrates a rear view of the primary disk 218, deflecting disk 220, wiper wheel 226 and support 304 are shown generally along the direction of motion. A vertical line 602 is illustrated extending upwardly along the z-axis. The primary disk 218 is generally a planar disk that extends along line 604. The deflecting disk 220 is a generally planar disk that extends along line 606. The wiper wheel 226 has a generally interior surface facing the primary disk 218 that extends along line 608.

The primary disk 218 is rolled at a first angle $\theta_P$ from vertical 602. The deflecting disk 220 is rolled at a second angle $\theta_D$ from vertical 602 in the same direction as the first angle $\theta_P$. The wiper wheel 226 is rolled at a third angle $\theta_W$ from vertical 602 in the opposite direction from the first angle $\theta_P$. In some aspects, the first angle $\theta_P$ measures between about 0° and about 4°. More preferably, the first angle $\theta_P$ measures about 2°. In some aspects, the second angle $\theta_D$ measures between about 4° and about 10°. More preferably, the second angle $\theta_D$ measures about 7°. In some aspects, the third angle $\theta_W$ measures between about 0° and about 4°. More preferably, the third angle $\theta_W$ measures about 2°.

Referring to FIG. 6B, a cross-sectional view of the furrow 224 created by the disk opener of FIG. 6A is shown generally along the direction of motion. The furrow 224 has an interior wall 610 and an exterior wall 612 extending into the soil from the surface 614. The furrow 224 has a width W at the surface 614 and generally narrows to a generally parabolic bottom 618. The interior wall 610 is rolled at a first furrow angle $\theta_{FP}$ from vertical 602. The exterior wall 610 is rolled at a second furrow angle $\theta_{FD}$ from vertical 602 in the same direction as the first furrow angle $\theta_{FP}$. In some aspects, the first furrow angle $\theta_{FP}$ is generally the same as the first angle $\theta_P$ and measures, for example, between about 0° and about 4°; more preferably about 2°. In some aspects, the second furrow angle $\theta_{FD}$ is generally the same as the second angle $\theta_D$ and measures, for example, between about 4° and about 10°; more preferably about 7°.

When the disk opener 202 is in use, the wiper wheel 226 generally follows the surface 614 of the field. The primary disk 218 and deflector disk 220 are partially disposed in the soil at a generally constant height relative to the wiper wheel. As will be explained in more detail with reference to FIG. 7 below, the relative height may change dependent upon several factors such as soil hardness.

As the primary disk 218 travels through the soil, the leading edge begins to cut the furrow 224. A leading face 616 and a trailing edge of the primary disk 218 generally form the interior wall 610 of the furrow 224 by engaging the soil. The exterior wall 612 of the furrow 224 is also formed by the leading edge 616 of the primary disk 218 engaging the soil. The deflecting disk 220 can also assist in shaping the exterior wall 612 of the furrow 224. Advantageously, the first furrow angle $\theta_{FP}$ allows the leading face 616 of the primary disk 218 to engage the soil such that the soil generally applies a downward force on the leading face 616. This helps to increase down-pressure on the primary disk 218. Also advantageously, the deflecting disk 220 is rolled outwardly at the second angle $\theta_D$ to slightly engage the exterior wall 612 of the furrow. This engagement exerts a lateral force toward the primary disk 218, aiding in the engagement of the leading face 616 of the primary disk 218 and creates additional down-pressure.

Figure 7:
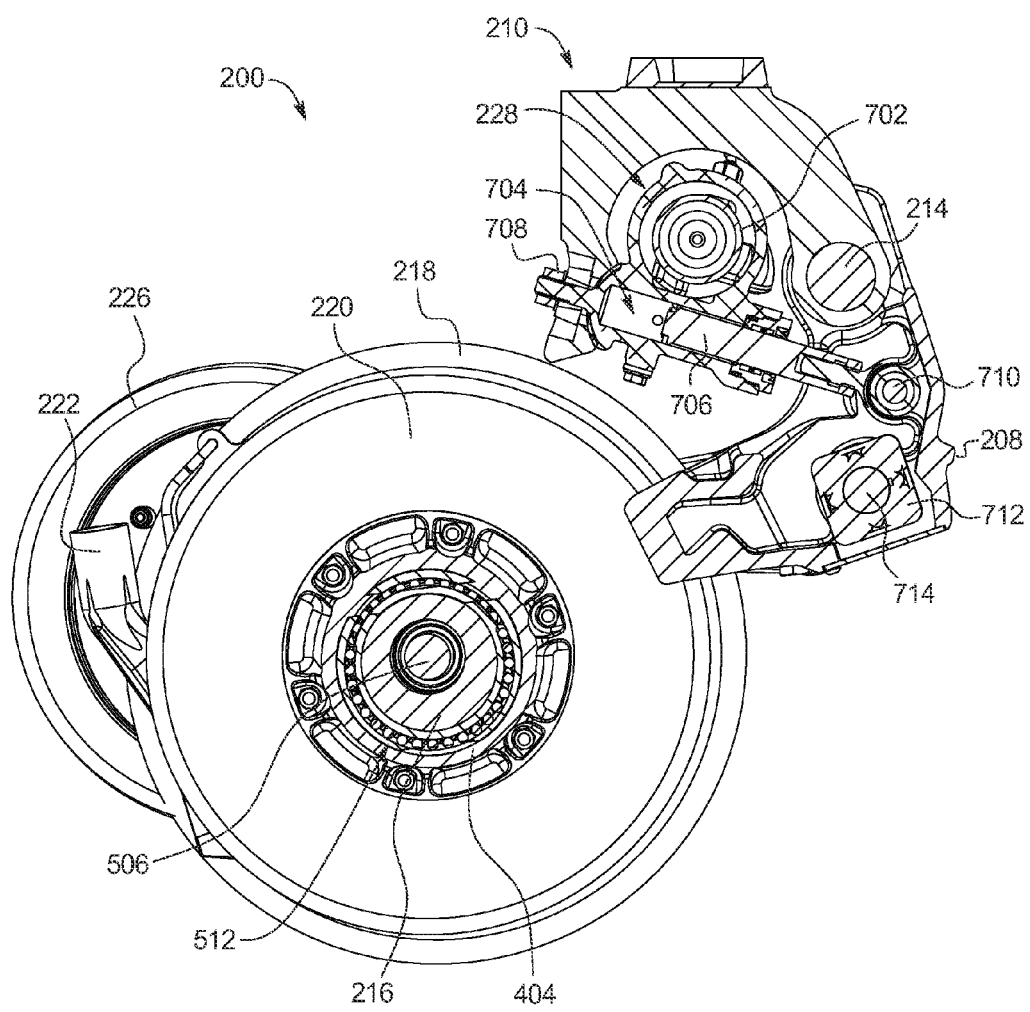
FIG. 7 illustrates a cross-sectional view of the disk opener of FIG. 4 along line VII-VII.

Referring to FIG. 7, a cross-sectional view of the disk opener 200 is shown along line VII-VII of FIG. 4. The proximal end 210 and the distal end 212 (FIG. 2) of the swing-arm 208 pivot about pin 214 relative to each other. The down-pressure mechanism 228 includes a hydraulic pump 702 having a cylinder 704 with a piston 706 disposed therein. The hydraulic pump 702 is attached to the proximal end 210 of the swing-arm 208 using crown nut 708. The piston 706 is attached to the distal end 212 (FIG. 2) of the swing-arm 208 using pin 710 such that axial movement of the piston 706 is configured to move the proximate end 210 relative to the distal end 212 (FIG. 2). In some aspects, hydraulic pump 702 receives a pressurized fluid from a fluid reservoir through the coupler 302 (FIG. 3). The pressurized fluid is a generally incompressible fluid such as hydraulic oil. The pump 702 is configured to control the pressure of fluid in cylinder 704. Increasing the pressure of fluid in the cylinder 704 causes the down-pressure mechanism 228 to apply more downward force to the primary disk 218 and the deflector disk 220. The fluid pressure can be increased by the pump 702 forcing more fluid into the cylinder 704. Conversely, the down-pressure mechanism 228 can decrease the amount of down-pressure applied by the primary disk 218 and the deflector disk 220 by decreasing the pressure of fluid in the cylinder 704. This can be accomplished, for example, by using pump 702 to actively remove fluid from the cylinder 704, or may be accomplished by passively venting the cylinder 704 until the desired fluid pressure is reached.

The down-pressure applied by down-pressure mechanism 228 can be constant or can be dynamically variable depending on soil conditions. For example, soil hardness can be measured to determine the proper applied down-pressure.

In one nonlimiting example, the swing-arm 208 includes a ground-hardness sensor 816 integrated within the furrow opening device. In some aspects, the ground-hardness sensor 816 (FIG. 8) is disposed within the distal end 212 of the swing-arm 208 and is fixed relative to the swing-arm 208. The ground-hardness sensor 816 has an aperture disposed therein and detects rotational movement of a shaft 714 disposed within the aperture. A torsion spring 712 is disposed within the swing-arm 208 and engages the shaft 714 to rotationally bias the shaft 714 toward an equilibrium point. The shaft 714 is configured to indicate the position of the wiper wheel 226 relative to the primary disk 219 and/or deflecting disk 220. The arm 304 (FIG. 3) fixes rotation of the shaft 714 to pivotal movement of the wiper wheel 226. Movement of the wiper wheel 226 relative to the primary disk 218 and deflecting disk 220 causes rotation of the shaft 714 within the sensor 816. In some aspects, the ground-hardness sensor 816 is an inductive linear position sensor. The inductive linear position sensor measures movement of a cam to determine movement of the wiper wheel 226 relative to the primary disk 218 and the deflecting disk 220.

In this non-limiting example, increased soil hardness will cause the primary disk 218 and deflecting disk 220 to cut a shallower furrow and, thus, rise relative to the wiper wheel 226. The shallower penetration will cause the shaft 714 to rotate from a home position in a counter-clockwise direction relative to the sensor 816. The sensor 816 detects the direction of the rotation and causes the down-pressure mechanism 228 to increase the applied down-pressure until the shaft 714 rotates clockwise and returns to the home position. Once in the home position, the down-pressure mechanism 228 maintains the down-pressure.

Alternatively, a decrease in soil hardness will cause the primary disk 218 and deflecting disk 220 to cut a deeper furrow and, thus, drop relative to the wiper wheel 226. The deeper penetration will cause the shaft 714 to rotate from the home position in a clockwise direction relative to the sensor 816. The sensor 816 detects the direction of the rotation and causes the down-pressure mechanism 228 to lower the applied down-pressure until the shaft 714 rotates counter-clockwise and returns to the home position. Once in the home position, the down-pressure mechanism 228 maintains the down-pressure.

Advantageously, dynamic variation of applied down-pressure allows the disk opener to create a consistent furrow depth independent of variation in ground hardness. This also allows consistent placement of material such as seed or fertilized. Consistent depth of seed placement is especially important in certain types of seed such as corn because uniform emergence and growth of plants leads to increased yields and crop health.

Figure 8:
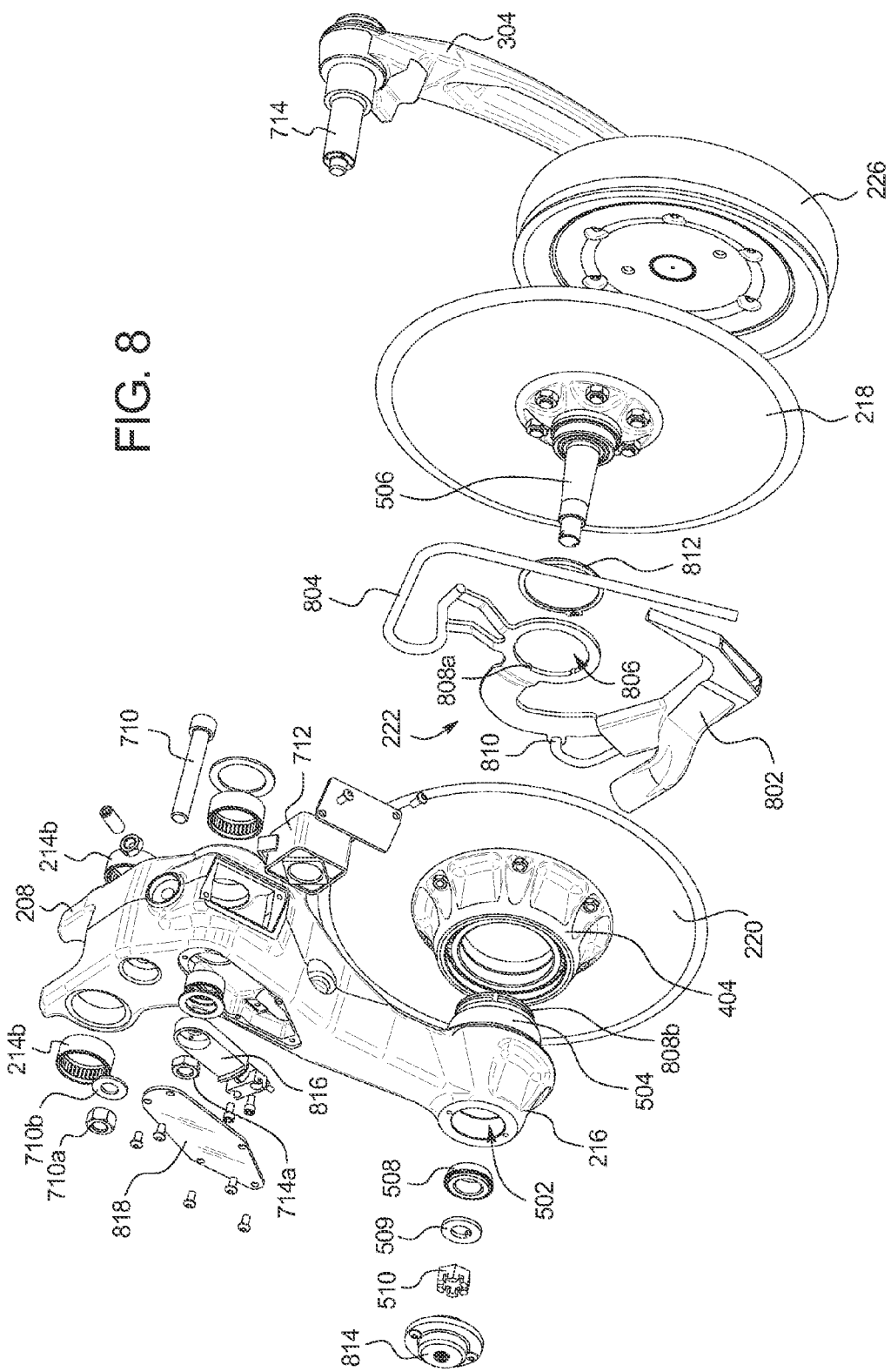
FIG. 8 illustrates an exploded view of a portion of the disk opener of FIG. 2.

Referring to FIG. 8, an exploded view of a portion of the disk opener 200 is shown. Two bearings 214b are disposed within the swing-arm 208 and configured to engage the pin 214 such that the proximate end 210 can pivot relative to the distal end 212. The pin 710 is disposed within the swing-arm 208. Nut 710a and washer 710b are used to prevent axial movement of the pin 710.

The deflecting disk 220 is coupled to the hub 404 using a plurality of fasteners. The bearing seat 504 receives the bearings disposed within hub 404. The hub 404 is prevented from axial movement by the bearing seat 504 and the material shoe apparatus 222.

The material shoe apparatus 222 includes a material shoe 802 and a mounting bracket 804. The mounting bracket 804 includes an aperture 806 configured to receive a portion of the housing 216. The aperture 806 includes a plurality of teeth 808a disposed therein and configured to engage a corresponding plurality of notches 808b on the housing 216. When the teeth 808a engage the notches 808b, the mounting bracket 804 cannot rotate relative to the housing 216. Axial movement of the mounting bracket is prevented by a fastener such as a snap ring 812 engaging the housing 216. The material shoe 802 is pivotably mounted to the bracket 804 using a pin 810 secured by a fastener (not shown). The pin 810 allows the material shoe 802 to be easily removed for maintenance or repair.

The spindle 506 is coupled to and extends from the primary disk 218. The spindle 506 is disposed within the housing 216 and extends through the fastener 812, the aperture 806, the hub 404 and deflecting disk 220, the bearing 508, and washer 509. The crown nut 510 is threaded onto the spindle 506 and fixed relative to the spindle 506 using, for example, a Cotter key. A cap 814 engages the housing 216 and prevents debris from entering the bore 502.

The arm 304 is configured to pivot about shaft 714 as the gauge wheel 226 moves along the surface of the field. The shaft 714 is received by the sensor 816. The shaft is prevented from axial movement by a fastener such as nut 714a. The sensor 816 includes an indicator configured to indicate a condition of the ground-hardness sensor 816. In some aspects, the indicator displays a green light when the ground-hardness sensor 816 is functioning properly and a red light when the ground-hardness sensor 816 is malfunctioning. The indicator is disposed behind a clear plastic cover 818. Clear plastic is used so that the indicator can be readily seen by an operator without the need for removing any parts from the device. Two electrical wires 820 are connected to the sensor 816 in order to power the sensor and/or carry data from the sensor to, for example, a processor. In one nonlimiting example, the ground-hardness sensor 816 outputs an analog signal that varies as the position of the wiper wheel 226 changes relative to the primary disk 218. In another nonlimiting example, the ground-hardness sensor 816 outputs a digital signal that conveys the position of the wiper wheel 226 relative to the primary disk 218.

In some aspects, a scraper or protrusion is used to remove soil and debris from the primary disk blade. In other aspects, the deflecting disk includes a scraper, protrusion, or wiper wheel to remove soil and debris from the deflecting disk. In yet other aspects, a gauge wheel is used in place of the wiper wheel 226 and does not clean the primary disk 218.

Figure 9:
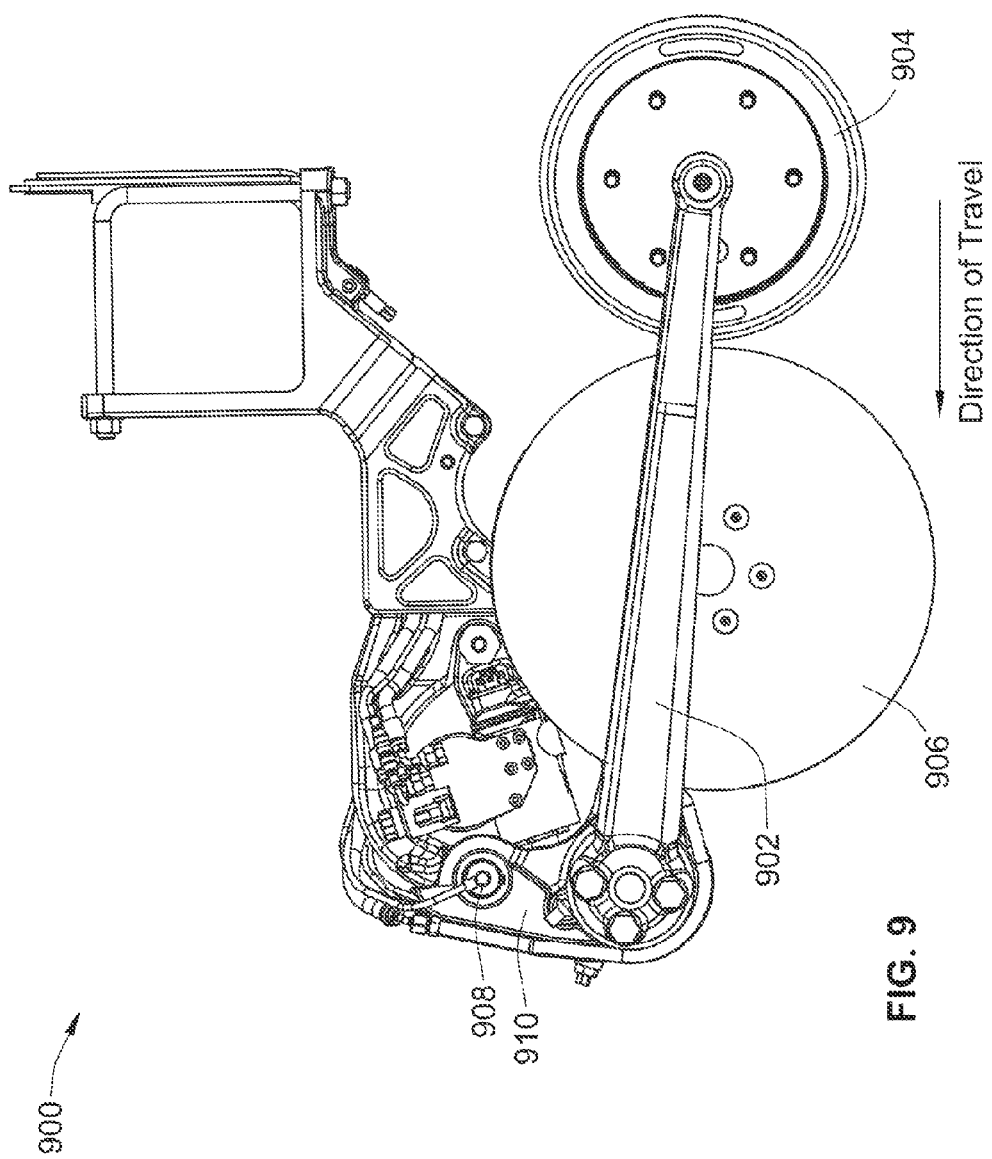
FIG. 9 is a side view of a disk opener with a gauge wheel attached via an extended swing-arm.

Referring to FIG. 9, a disk opener row unit 900 includes one or more features similar to or identical to features described above in reference to FIGS. 1-8, but in addition or alternatively has a gauge-wheel arm 902 for attaching a gauge wheel 904 (also previously referred to as a wiper wheel) such that the gauge wheel 904 completely trails at least one opener disk 906. In other words, the gauge-wheel arm 902 is longer than the support 304 (FIG. 3) to allow placement of the gauge wheel 904 much farther relative to a pivoting axis 908 of a swing-arm 910. In this exemplary configuration, a leading edge of the gauge wheel 904 is located rearwardly of a trailing edge of the opener disk 906. The location of the gauge wheel 904 relative to the opener disk 906 is described relative to the direction of travel.

Some of the features of the disk opener row unit 900 include an attachment frame 912 for rigidly attaching the swing-arm 910 to a tow bar (not shown), and a hydraulic cylinder 914. The hydraulic cylinder 914 applies pressure to the swing-arm 910, to control the downwards force exerted by the opener disk 906 in forming a furrow. The hydraulic cylinder 914 can lower or raise the opener disk 906, as applicable.

Figure 10:
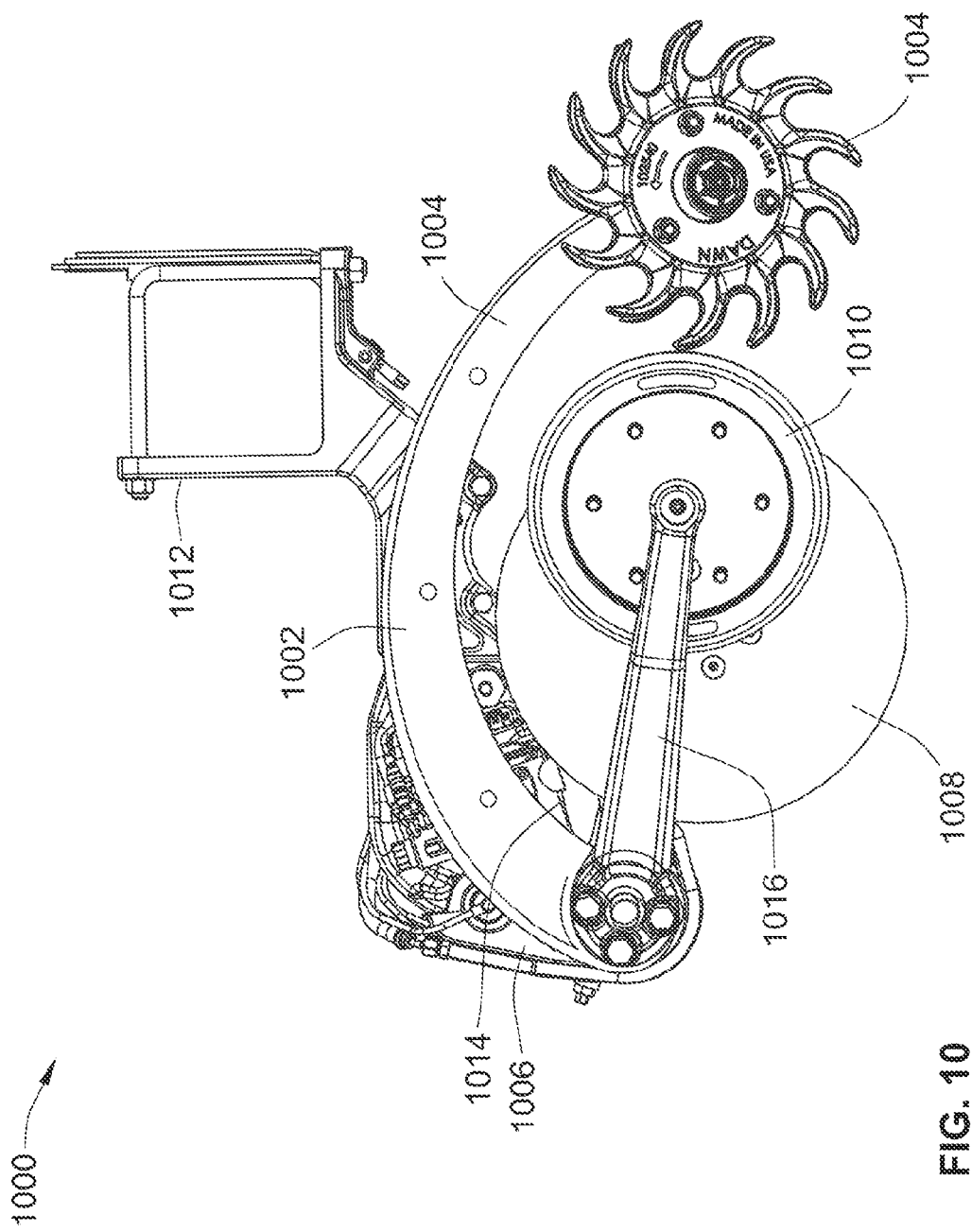
FIG. 10 is a side view of a disk opener with a closing wheel attached via a closing-wheel arm.

Referring to FIG. 10, a disk opener row unit 1000 includes one or more features similar or identical to features described above in reference to FIGS. 1-9, but in addition or alternatively has a closing-wheel arm 1002 for attaching at least one closing wheel 1004. The closing-wheel arm 1002 attaches the closing wheel 1004 to a swing-arm 1006, to which at least one opener disk 1008 and a gauge wheel 1010 are also attached. The swing-arm 1006 is rigidly attached to a tow bar (not shown) via an attachment frame 1012 and has a controllable force applied via a hydraulic cylinder 1014.

In this example, the closing-wheel arm 1002 is shaped with an upward curvature to prevent physical interference between the closing-wheel arm 1002 and the opener disk 1008, the gauge wheel 1010, or a gauge-wheel arm 1016. In other examples, the closing-wheel arm 1002 can have other shapes and/or be attached to other attachment points of the disk opener row unit 1000.

In the illustrated example, the closing wheel 1004 is a toothed wheel such as a CURVETINE™ wheel manufactured by Dawn Equipment Company (assignee of the present application). In other examples, the closing wheel 1004 can be any type of closing wheel, including smooth rubber wheels, smooth cast-iron wheels, wedge wheels, spiked wheels, etc.

Optionally, the disk opener row unit 1000 includes a pair of closing wheels 1004. The closing wheels 1004 can be both attached to the same closing-wheel arm 1002 or can each have its own closing-wheel arm 1002. According to one example, the closing wheels 1004 are symmetrically attached to the closing-wheel arm 1002, to the swing-arm 1006, or to any other portion of the disk opener row unit 900.

Figure 11:
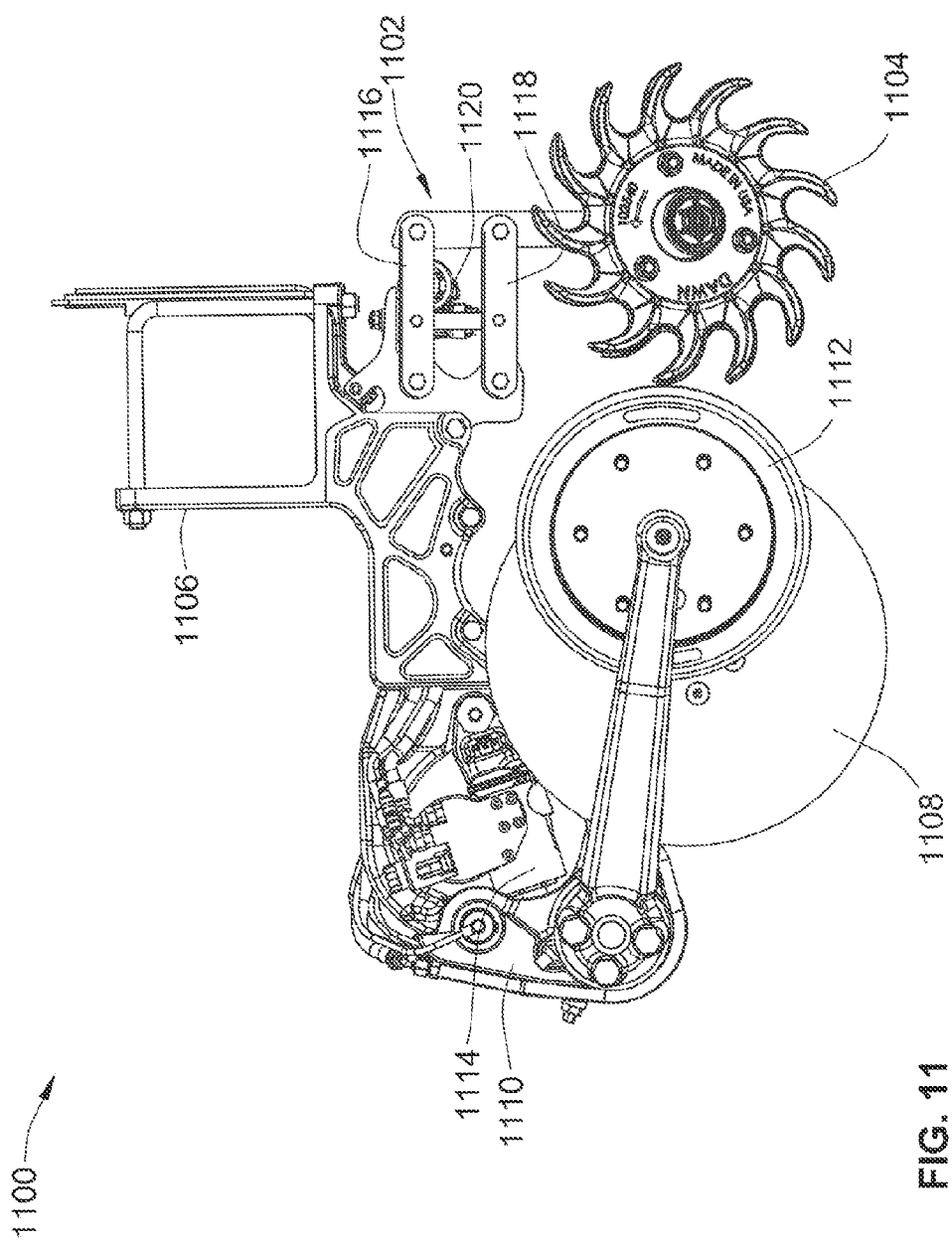
FIG. 11 is a side view of a disk opener with a closing wheel attached via a parallel linkage.

Referring to FIG. 11, a disk opener row unit 1100 includes one or more features similar or identical to features described above in reference to FIGS. 1-10, but in addition or alternatively has a parallel linkage 1102 for attaching at least one closing wheel 1104. The parallel linkage 1102 is attached to an attachment frame 1106, which, in turn, is rigidly attached to a tow bar (not shown). Similar to disk opener row units described above, the disk opener row unit 1100 includes at least one opener disk 1108 attached to the attachment frame 1106 via a swing-arm 1110, a gauge wheel 1112, and a hydraulic cylinder 1114 for applying a controllable force to the opener disk 1108.

The parallel linkage 1102 is a conventional four-bar linkage assembly used in agricultural implements to permit the raising and lowering of tools attached thereto. The parallel linkage 1102 includes a pair of parallel upper links 116 and a pair of parallel lower links 1118 that are interconnected to permit up-and-down movement of the closing wheel 1104. Optionally, the parallel linkage 1102 includes its own hydraulic cylinder 1120 for applying a controllable force to the closing wheel 1104.

Figure 12:
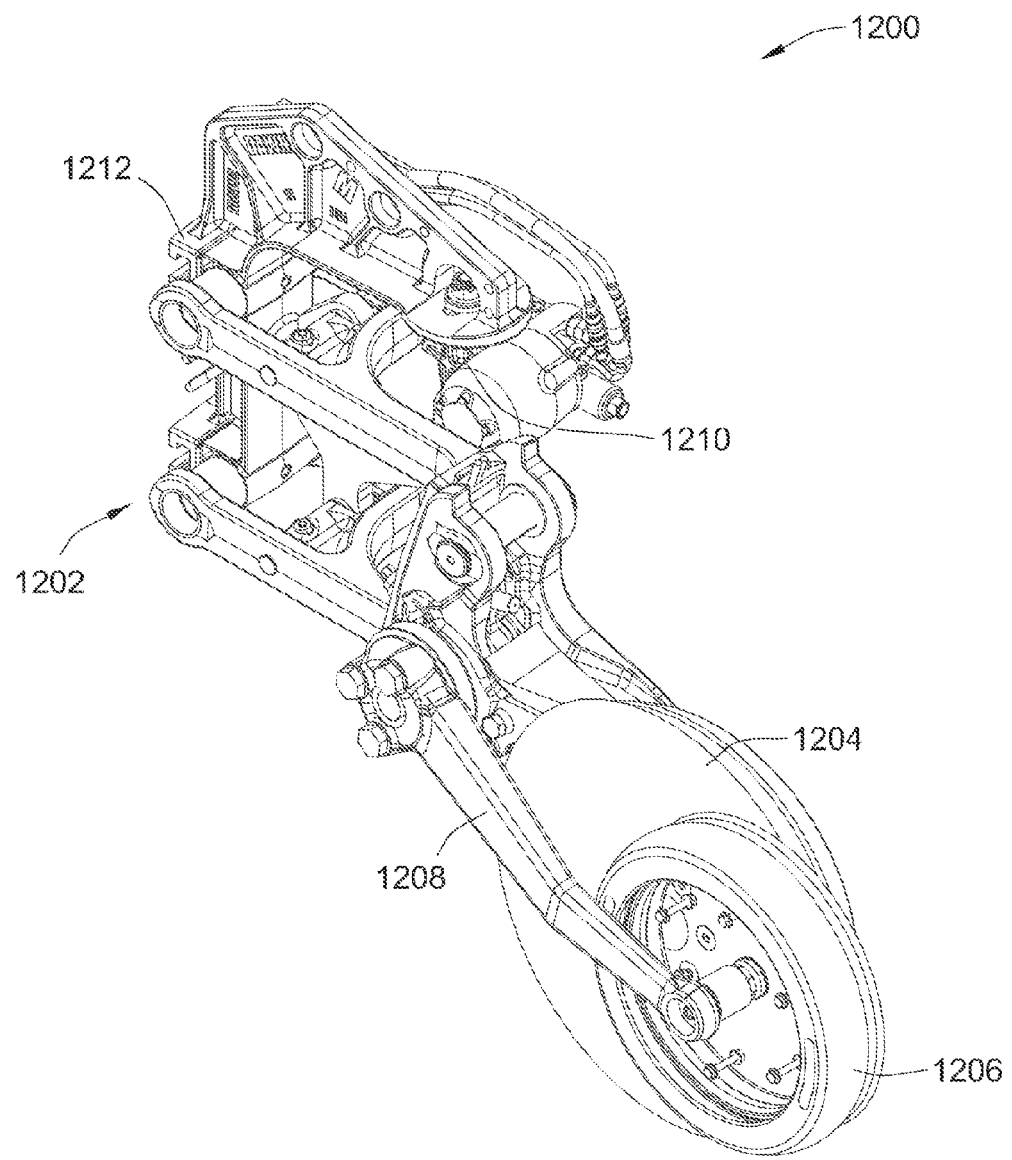
FIG. 12 is a perspective view of a disk opener with a parallel linkage attachment.
Figure 13:
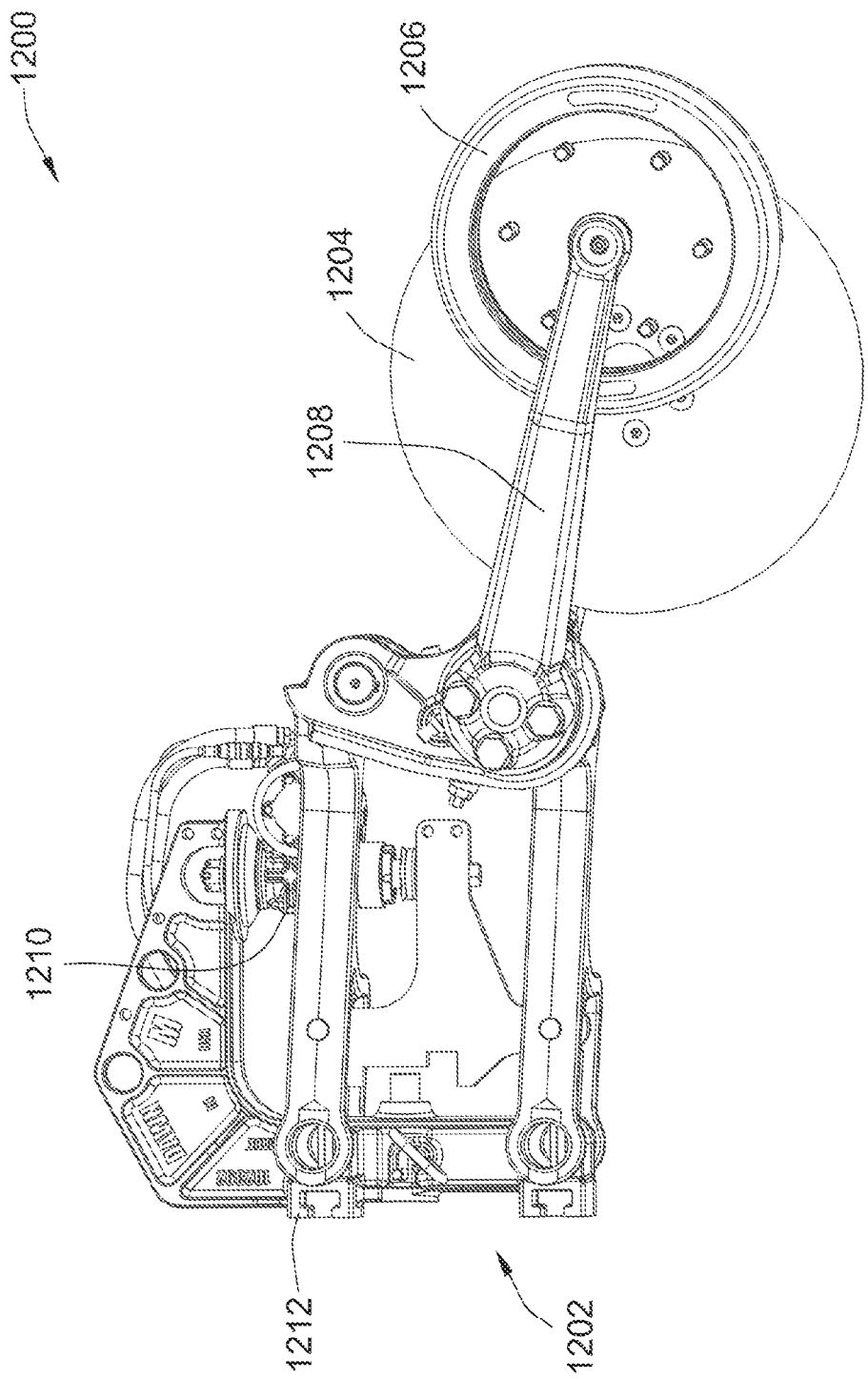
FIG. 13 is a left side view of FIG. 12.
Figure 14:
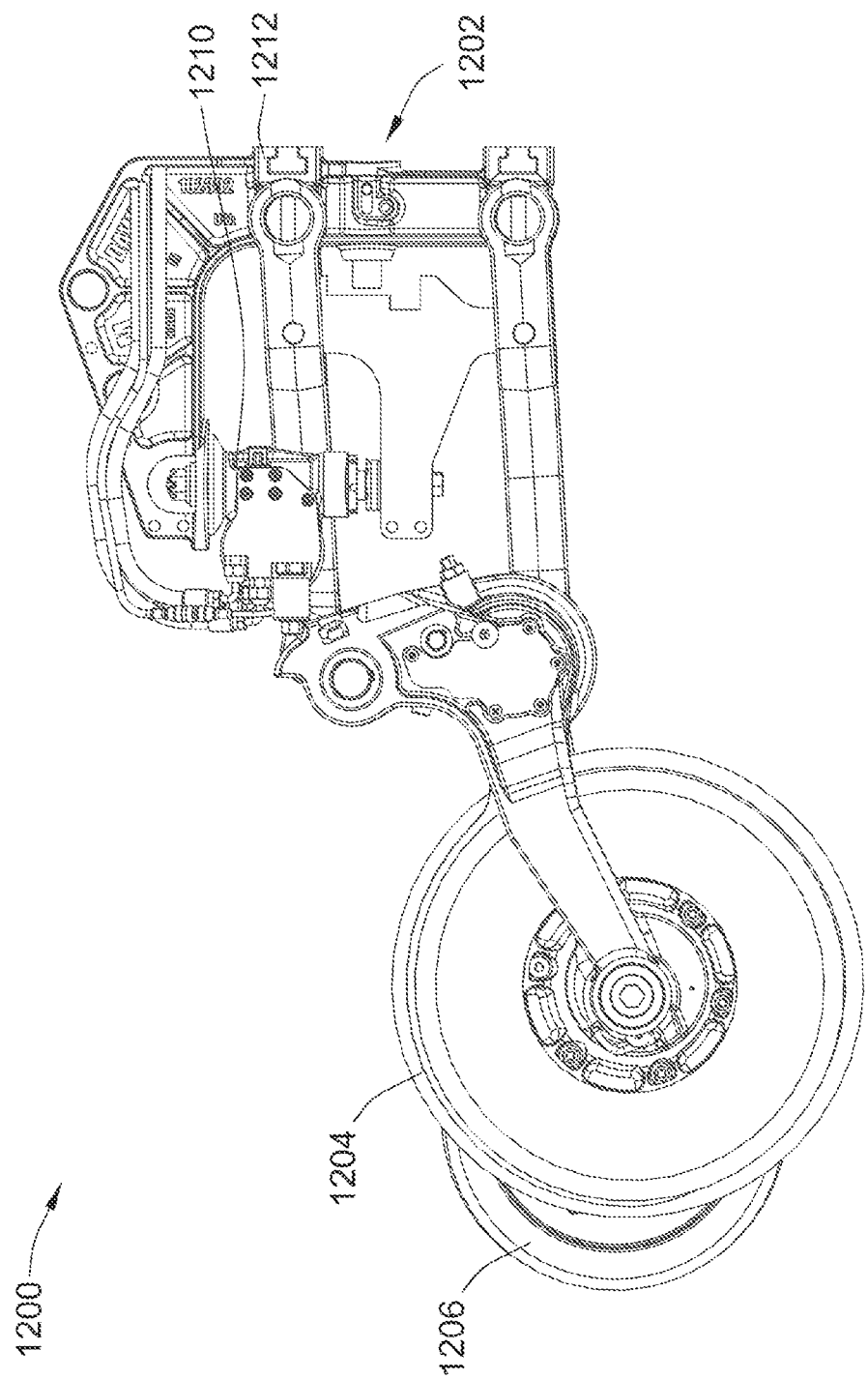
FIG. 14 is a right side view of FIG. 12.

Referring to FIGS. 12-14, a disk opener row unit 1200 includes one or more features similar or identical to features described above in reference to FIGS. 1-11, but alternatively is attachable to a tow bar via a parallel linkage 1202 (instead of a swing-arm type attachment). The disk opener row unit 1200 further includes at least one opener disk 1204 (attached via a disk arm to the parallel linkage 1202), a gauge wheel 1206 (attached via a gauge-wheel arm 1208), and a hydraulic cylinder 1210.

The parallel linkage 1202 is pivotably coupled to a towing frame 1212 (which is attachable to a tow bar) and permits movement of the opener disk 1204 relative to the tow bar. The hydraulic cylinder 1210 provides a controllable force for applying down or up pressure to the opener disk 1204. According to one example, the parallel linkage 1202 is a FREEFARM LARGE LINKAGE, which is manufactured by Dawn Equipment Company, weighs approximately 250 pounds, and provides up to about 16 inches of vertical travel.

Referring to FIG. 15A, a swing-arm assembly 1300 includes a swing-arm 1302 and is adapted for use in a disk opener assembly, such as the disk openers 200, 900, 1000, 1100, 1200 described above and illustrated in FIGS. 2-14. The swing-arm 1302 has a housing 1304 at a distal end 1302*a* and a pin 1306 at a proximal end 1302*b*. The swing-arm assembly 1300 and at least some of its components are similar, but necessarily identical, to counterpart components described above in reference to the identified disk openers.

A pair of disks, including a primary disk (or primary blade) 1308 and a deflecting disk (or deflecting blade) 1310, are mounted to the distal end 1302*a* of the swing-arm 1302. The swing-arm assembly 1300 further includes a support arm 1312 (illustrated in FIG. 15B) extending from the proximal end 1302*b* of the swing-arm 1302. A gauge wheel 1314 is mounted to the support arm 1312 via a shaft 1316 (illustrated in FIG. 15B).

In addition to or instead of counterpart components described above in FIGS. 2-14 in reference to alternative embodiments, the swing-arm assembly 1300 includes a support bracket 1318 and a fertilizer tube 1320. The support bracket 1318 has a mounted end 1318*a* attached to the proximal end 1302*b* of the swing-arm 1302. The support bracket 1318 has a free end 1318*b* extending past the distal end 1302*a* of the swing-arm 1302. Thus, the support bracket 1318 is a cantilevered structure depending from the swing-arm 1302. In-between the two ends 1318*a*, 1318*b*, the support bracket 1318 has an arch-shaped section 1318*c* that generally follows the shape of the primary disk 1308.

The fertilizer tube 1320 is attached to a bottom edge of the support bracket 1318 and is contoured similar to the shape of the support bracket 1318. The fertilizer tube 1320 is adapted to expel a liquid fertilizer or other liquids into a formed furrow. Alternatively, the fertilizer tube 1320 is a tube that dispenses seeds or other solids into the formed furrow. According to one example, the fertilizer tube 1320 is a hose affixed to or routed through the support bracket 1318.

Referring to FIG. 15B, the arch-shaped section 1318c and the free end 1318b of the support bracket 1318 are located in a space 1322 between the primary disk 1308 and the deflecting disk 1310. The space 1322 would otherwise be empty without the support bracket 1318. As such, one benefit of the support bracket 1318 is that its shape and mounting position efficiently uses the limited available space in the swing-arm assembly 1300.

Referring to FIG. 16A, the support bracket 1318 extends linearly between the support arm 1312 and the distal end 1302a of the swing-arm 1302. The mounted end 1308a is fixed directly to the swing-arm 1302 via a pair of bolts 1324 that are threaded into respective bolt holes 1326 (illustrated in FIG. 16B). The free end 1318b of the support bracket 1318 extends a distance D from the mounted end 1308, and is positioned a distance X from the outer periphery of the gauge wheel 1314.

Referring to FIG. 16B, the fertilizer tube 1320 extends a distance L beyond the free end 1318b of the support bracket 1318. The support bracket 1318 has a generally uniform width W along the arch-shaped section 1318c that is greater than a diameter A of the fertilizer tube 1320. In other embodiments, the width W and the diameter A can have any dimension and can have a varying shape. In particular, the support bracket 1318 provides a stable supporting structure for the fertilizer tube 1320.

The mounted end 1318a of the support bracket 1318 is adjacent to a torsion spring 1328 that is mounted internally within the swing-arm 1302. The torsion spring compresses 1328 to dampen force effects when the swing-arm 1302 rotates, providing a smooth change in movement for the swing-arm 1302.

Referring to FIG. 16C, the support bracket 1318 is slightly angled in a vertical direction relative to the swing-arm 1302 and the support arm 1312. In other embodiments, the support bracket 1318 can have other angles of orientations that do not interfere mechanically with components of the swing-arm assembly 1300.

Referring to FIGS. 17A-17C, the illustrated views are counterpart views of FIGS. 16A-16C, respectively, except that the primary and deflecting disks 1308, 1310 are also illustrated to further illustrate the position of the support bracket 1318 in the space 1322 between the primary disk 1308 and the deflecting disk 1310. Specifically, as illustrated in FIG. 17C, the support bracket 1318 is angled from the primary disk 1308 and the deflecting disk 1310 at respective angles $\alpha$ and $\beta$, respectively. The clearance provided by angles $\alpha$ and $\beta$ help prevent physical interference between the support bracket 1318 (and attached fertilizer tube 1320) and the disks 1308, 1310.

Furthermore, in reference to FIG. 17B, the primary disk 1308 has a radius R1 that is generally greater than a distance R2, which extends from a center point O of the primary disk 1308 to a top edge of the support bracket 1318. As such, the support bracket 1308 (and fertilizer tube 1320) is protected from debris and/or other environmental conditions by the primary disk 1308 and/or the deflecting disk 1310. The radius of the deflecting disk 1310 is at least about the same as the distance R2.

The bottom edge of the fertilizer tube 1320 is at a smaller distance R3 from the center point O, and is intended to maximize the distance between the fertilizer tube 1320 and debris, such as dirt and rocks, thrown by the primary disk 1308. In this embodiment, the distances R1 and R2 are generally radial distances. However, in other embodiments the distances R1 and R2 can be any distance that eliminates mechanical interference between the support bracket 1318 and other components of the swing-arm assembly 1300, and that locates the support bracket 1318 and the fertilizer tube 1320 into an area generally protected from debris or other adverse environmental conditions.

It will be evident to those skilled in the art that the invention is not limited to the details of the foregoing illustrated embodiment and that the present invention may be embodied in other specific forms without departing from the spirit or essential attributes thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An agricultural row unit assembly, comprising:
an attachment frame configured for attachment to a tow bar movable in a direction of travel;
a swing-arm having a proximal end and a distal end, the proximal end being coupled to the attachment frame;
an opener disk mounted to and offset from the distal end of the swing-arm for forming a furrow, the opener disk being configured to rotate about a first axis relative to the direction of travel;
a deflecting disk mounted to the distal end of the swing-arm for deflecting debris from entering the furrow, the deflecting disk being configured to rotate about a second axis relative to the direction of travel, the second axis being different than the first axis;
a support having a first end pivotably mounted to the swing-arm and a second end movable relative to the opener disk;
a gauge wheel mounted to the second end of the support; and
a ground-hardness sensor disposed within the swing-arm and configured to detect movement of the gauge wheel relative to the opener disk.

2. The agricultural row unit assembly of claim 1, wherein the ground-hardness sensor outputs an analog signal that varies as the position of the gauge wheel changes relative to the opener disk.

3. The agricultural row unit assembly of claim 1, wherein the ground-hardness sensor outputs a digital signal that conveys the position of the gauge wheel relative to the opener disk.

4. The agricultural row unit assembly of claim 1, wherein the ground-hardness sensor is an inductive linear position sensor.

5. The agricultural row unit assembly of claim 1, further comprising a down-pressure mechanism coupled to the opener disk, the down-pressure mechanism being configured to increase or decrease a down-pressure force applied to the opener disk.

6. The agricultural row unit assembly of claim 5, wherein the down-pressure force applied by the down-pressure mechanism is constant.

7. The agricultural row unit assembly of claim 5, wherein the down-pressure mechanism is further coupled to the ground-hardness sensor, the down-pressure force being dynamically variable in response to variation of ground hardness as detected by the ground-hardness sensor.

8. The agricultural row unit assembly of claim 5, wherein the down-pressure mechanism includes a hydraulic cylinder.

9. The agricultural row unit assembly of claim 1, further comprising a down-pressure mechanism coupled to the opener disk and to the ground-hardness sensor, the down-pressure mechanism being configured to apply a dynamically variable force to the opener disk in response to variation of ground hardness detected by the ground-hardness sensor, the opener disk forming a consistent furrow depth that is independent of variation in ground hardness.

10. The agricultural row unit assembly of claim 1, wherein the ground-hardness sensor has an aperture disposed therein and is configured to detect rotational movement of a shaft disposed within the aperture, the shaft being coupled to the gauge wheel and indicative of the position of the gauge wheel relative to the opener disk.

11. The agricultural row unit assembly of claim 10, wherein the ground-hardness sensor further includes a torsion spring that engages the shaft to rotationally bias the shaft toward an equilibrium point.

12. An agricultural row unit assembly, comprising:
an attachment frame configured for attachment to a tow bar movable in a direction of travel;
a swing-arm having a proximal end and a distal end, the proximal end being coupled to the attachment frame;
an opener disk mounted to and offset from the distal end of the swing-arm for forming a furrow;
a deflecting disk mounted to the distal end of the swing-arm for deflecting debris from entering the furrow, the deflecting disk being mounted between the distal end of the swing-arm and the opener disk;
a gauge wheel mounted to the swing-arm and being movable relative to the opener disk and the deflecting disk; and
a ground-hardness sensor coupled to the opener disk and the gauge wheel, the ground-hardness sensor outputting a signal indicative of the position of the gauge wheel relative to the opener disk.

13. The agricultural row unit assembly of claim 12, wherein the signal is an analog signal or a digital signal.

14. The agricultural row unit assembly of claim 12, wherein the ground-hardness sensor is an inductive linear position sensor.

15. The agricultural row unit assembly of claim 12, further comprising a down-pressure mechanism coupled to the opener disk, the down-pressure mechanism being configured to increase or decrease a down-pressure force applied to the opener disk.

16. The agricultural row unit assembly of claim 15, wherein the down-pressure mechanism includes a hydraulic cylinder.

17. The agricultural row unit assembly of claim 12, further comprising a down-pressure mechanism coupled to the opener disk and to the ground-hardness sensor, the down-pressure mechanism being configured to apply a dynamically variable force to the opener disk in response to variation of ground hardness detected by the ground-hardness sensor, the opener disk forming a consistent furrow depth that is independent of variation in ground hardness.

18. The agricultural row unit assembly of claim 12, wherein the ground-hardness sensor has an aperture disposed therein and is configured to detect rotational movement of a shaft disposed within the aperture, the shaft being coupled to the gauge wheel and indicative of the position of the gauge wheel relative to the opener disk.

19. The agricultural row unit assembly of claim 18, wherein the ground-hardness sensor further includes a torsion spring that engages the shaft to rotationally bias the shaft toward an equilibrium point.

20. The agricultural row unit assembly of claim 12, wherein the opener disk is positioned between the deflecting disk and the gauge wheel, the gauge wheel being parallel to and near the opener disk for removing soil or other debris from the opener disk.

* * * * *